(12) United States Patent
Yang et al.

(10) Patent No.: US 11,564,248 B2
(45) Date of Patent: Jan. 24, 2023

(54) TECHNIQUES FOR ACTIVATION AND DEACTIVATION OF RESOURCES CONFIGURED ACROSS MULTIPLE COMPONENT CARRIERS

(71) Applicant: QUALCOMM Incorporated, San Diego, CA (US)

(72) Inventors: Wei Yang, San Diego, CA (US); Seyedkianoush Hosseini, San Diego, CA (US); Huilin Xu, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/158,594

(22) Filed: Jan. 26, 2021

(65) Prior Publication Data
US 2021/0235484 A1 Jul. 29, 2021

Related U.S. Application Data

(60) Provisional application No. 62/967,318, filed on Jan. 29, 2020.

(51) Int. Cl.
*H04W 72/12* (2009.01)
(52) U.S. Cl.
CPC ... *H04W 72/1289* (2013.01); *H04W 72/1268* (2013.01); *H04W 72/1273* (2013.01)
(58) Field of Classification Search
None
See application file for complete search history.

(56) References Cited

U.S. PATENT DOCUMENTS

| | | | | |
|---|---|---|---|---|
| 8,995,376 B2* | 3/2015 | Pan | ..................... | H04W 52/146 370/329 |
| 2011/0081932 A1* | 4/2011 | Astely | ................... | H04W 28/26 455/509 |
| 2013/0003668 A1* | 1/2013 | Xiao | ...................... | H04L 5/0098 370/329 |
| 2013/0242813 A1* | 9/2013 | Wang | ................... | H04L 1/1854 370/280 |
| 2015/0373695 A1* | 12/2015 | Skärby | .............. | H04W 72/0413 370/329 |

(Continued)

*Primary Examiner* — Phirin Sam
(74) *Attorney, Agent, or Firm* — Dalei Dong; Holland & Hart LLP

(57) ABSTRACT

Techniques and devices for wireless communications are described to support communication over multiple component carriers using configured resources. A base station may identify a resource configuration for one or more sets of configured resources for communication with a user equipment (UE) and may indicate the resource configuration to the UE. The base station may transmit a downlink control message to the UE that includes a field to indicate one or more sets of resources that are to be activated or deactivated. The UE may receive the downlink control message and, based on the downlink control message, may identify the one or more indicated sets of resources. The UE may determine, based on the downlink control message, whether the one or more sets of resources is activated or deactivated. The UE and the base station may communicate based on the one or more activated or deactivated sets of resources.

30 Claims, 17 Drawing Sheets

(56) References Cited

U.S. PATENT DOCUMENTS

| | | | |
|---|---|---|---|
| 2019/0222357 A1* | 7/2019 | Huang | H04W 72/0446 |
| 2019/0281588 A1* | 9/2019 | Zhang | H04L 5/0051 |
| 2020/0351069 A1* | 11/2020 | Grant | H04L 5/0051 |
| 2021/0028848 A1* | 1/2021 | Tsai | H04W 16/28 |
| 2021/0099259 A1* | 4/2021 | Salem | H04W 72/042 |
| 2021/0136646 A1* | 5/2021 | Tseng | H04L 5/001 |
| 2021/0185706 A1* | 6/2021 | Park | H04L 5/0055 |
| 2021/0360674 A1* | 11/2021 | Lim | H04L 5/001 |

* cited by examiner

| Codepoint 405 | Resources 410 |
|---|---|
| 00 | (CC1, RS 1) |
| 01 | (CC1, RS 1), (CC2, RS 1) |
| 10 | (CC3, RS 1), (CC3, RS 2), (CC3, RS 3) |
| 11 | (CC1, RS 2), (CC2, RS 2) |

| Codepoint 405 | Resources 410 |
|---|---|
| 00 | RS 1 |
| 01 | RS 1, RS 2 |
| 10 | RS 4, RS 5, RS 6 |
| 11 | RS 1, RS 3 |

| Codepoint 405 | Resources 410 |
|---|---|
| 00 | (CC1, RS 1) |
| 01 | (CC1, RS 1), (CC2, RS 1) |
| 10 | (CC3, RS 1), (CC3, RS 2), (CC3, RS 3) |
| 11 | (CC1, RS 2), (CC2, RS 2) |

415-b

| Codepoint 405 | Resources 410 |
|---|---|
| 00 | (CC2, RS 1) |
| 01 | (CC2, RS 2) |
| 10 | (CC2, RS 1), (CC2, RS 2) |
| 11 | (CC1, RS 1), (CC3, RS 1) |

| Codepoint 405 | Resources 410 |
|---|---|
| 00 | RS 1 |
| 01 | RS 1, RS 2 |
| 10 | RS 4, RS 5, RS 6 |
| 11 | RS 1, RS 3 |

415-d

| Codepoint 405 | Resources 410 |
|---|---|
| 00 | RS 1, RS 2 |
| 01 | RS 2 |
| 10 | RS 3, RS 4, RS 5 |
| 11 | RS 1, RS 2, RS 6 |

TECHNIQUES FOR ACTIVATION AND DEACTIVATION OF RESOURCES CONFIGURED ACROSS MULTIPLE COMPONENT CARRIERS

CROSS REFERENCE

The present application for patent claims the benefit of U.S. Provisional patent Application No. 62/967,318 by YANG et al., entitled "TECHNIQUES FOR ACTIVATION AND DEACTIVATION OF RESOURCES CONFIGURED ACROSS MULTIPLE COMPONENT CARRIERS," filed Jan. 29, 2020, assigned to the assignee hereof, and which is hereby incorporated by reference in its entirety.

FIELD OF DISCLOSURE

The present disclosure, for example, relates to wireless communication systems, more particularly to techniques for activation and deactivation of resources configured across multiple component carriers.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some frequency bandwidths, communication resources may be limited. The limited resources may increase communication delays and latency by using resources for control signaling that may otherwise be used for other communications.

SUMMARY

The described techniques relate to improved techniques, devices, and apparatuses that support techniques for activation and deactivation of resources configured across multiple component carriers (CCs). For example, the described techniques provide for communication over multiple CCs using configured resources. A base station may determine or identify a resource configuration for one or more sets of configured resources for communication with a user equipment (UE) and may transmit a configuration message to the UE, to indicate the resource configuration to the UE. The resource configuration may include multiple sets of resources, and may include a list or table indicating the multiple sets of resources and an association between each set of resources and a codepoint or field value of a downlink control message. The base station may associate the resource configuration with a CC, or may indicate resources within the resource configuration, using one or more techniques.

The base station may transmit a downlink control message to the UE that includes a field or codepoint to indicate one or more sets of resources that are to be activated or deactivated. In some cases, the downlink control message may also include an indication of whether the one or more sets of resources are to be activated or deactivated (e.g., indicating a status of communication activity for the one or more sets of resources). The UE may receive the downlink control message and, based on the downlink control message (e.g., based on a value of the field or codepoint), may identify the one or more indicated sets of resources (e.g., a first set of resources). The UE may further determine, based on the downlink control message, whether the one or more sets of resources is being activated or deactivated (e.g., may determine a status of communication activity for the one or more sets of resources). The UE and the base station may communicate based on the one or more activated or deactivated sets of resources, where the one or more sets of resources may include one or more sets of downlink resources (e.g., downlink semi-persistently scheduled (SPS) resources) or one or more sets of uplink resources (e.g., uplink configured grants).

A method of wireless communication at a UE is described. The method may include receiving, from a base station, a configuration of one or more sets of resources for a set of CCs for communications with the base station, receiving a downlink control message indicating a status of communication activity on a first set of resources of the one or more sets of resources, and communicating with the base station based on the determined status of communication activity on the first set of resources.

An apparatus for wireless communication at a UE is described. The apparatus may include a processor, memory coupled with the processor, and instructions stored in the memory. The instructions may be executable by the processor to cause the apparatus to receive, from a base station, a configuration of one or more sets of resources for a set of CCs for communications with the base station, receive a downlink control message indicating a status of communication activity on a first set of resources of the one or more sets of resources, and communicate with the base station based on the determined status of communication activity on the first set of resources.

Another apparatus for wireless communication at a UE is described. The apparatus may include means for receiving, from a base station, a configuration of one or more sets of resources for a set of CCs for communications with the base station, receiving a downlink control message indicating a status of communication activity on a first set of resources of the one or more sets of resources, and communicating with the base station based on the determined status of communication activity on the first set of resources.

A non-transitory computer-readable medium storing code for wireless communication at a UE is described. The code may include instructions executable by a processor to receive, from a base station, a configuration of one or more sets of resources for a set of CCs for communications with the base station, receive a downlink control message indicating a status of communication activity on a first set of resources of the one or more sets of resources, and communicate with the base station based on the determined status of communication activity on the first set of resources.

In some examples of the method, apparatuses, and non-transitory computer-readable medium described herein, receiving the configuration of the one or more sets of resources further may include operations, features, means, or instructions for receiving an indication of the one or more sets of resources for a group of CCs of the set of CCs, where each value of a field of the downlink control message may be associated with a set of the one or more sets of resources.

In some examples of the method, apparatuses, and non-transitory computer-readable medium described herein, receiving the configuration of the one or more sets of resources further may include operations, features, means, or instructions for receiving a list of resources for each CC of the set of CCs, where each combination of a CC of the set and a value of a field of the downlink control message may be associated with a set of the one or more sets of resources.

Some examples of the method, apparatuses, and non-transitory computer-readable medium described herein may further include operations, features, means, or instructions for identifying a field of the downlink control message that indicates the first set of resources, where the status of communication activity may be based on identifying the field.

Some examples of the method, apparatuses, and non-transitory computer-readable medium described herein may further include operations, features, means, or instructions for identifying the first set of resources based on a value of the field, where the status of communication activity may be based on identifying the first set of resources.

In some examples of the method, apparatuses, and non-transitory computer-readable medium described herein, identifying the first set of resources further may include operations, features, means, or instructions for determining a first index of a resource of the first set of resources based on the configuration of the one or more sets of resources and the value of the field, where each resource of the first set of resources may be associated with a respective first index indicating a CC of the set of CCs that may be associated with the respective resource, and determining a second index of the resource based on the configuration of the one or more sets of resources and the value of the field, where each resource of the first set of resources may be associated with a respective second index indicating a respective resource within the associated CC, the second index unique to the associated CC.

In some examples of the method, apparatuses, and non-transitory computer-readable medium described herein, determining the first index and the second index further may include operations, features, means, or instructions for identifying a CC of the set used to receive the downlink control message, and determining, based on the configuration of the one or more sets of resources, the first index and the second index using a list of indices for the identified CC.

In some examples of the method, apparatuses, and non-transitory computer-readable medium described herein, identifying the first set of resources further may include operations, features, means, or instructions for determining an index of a resource of the first set of resources based on the configuration of the one or more sets of resources and the value of the field, where each resource of the first set of resources may be associated with a respective index indicating a respective resource, the index global to the set of CCs.

In some examples of the method, apparatuses, and non-transitory computer-readable medium described herein, determining the index further may include operations, features, means, or instructions for identifying a CC of the set used to receive the downlink control message, and determining, based on the configuration of the one or more sets of resources, the index using a list of indices for the identified CC.

In some examples of the method, apparatuses, and non-transitory computer-readable medium described herein, receiving the downlink control message indicating the status of communication activity further may include operations, features, means, or instructions for receiving an indication that the first set of resources is activated.

Some examples of the method, apparatuses, and non-transitory computer-readable medium described herein may further include operations, features, means, or instructions for receiving scheduling information for the first set of resources based on the first set of resources being activated, the scheduling information including a time resource allocation, a frequency resource allocation, a multiplexing scheme, or any combination thereof.

Some examples of the method, apparatuses, and non-transitory computer-readable medium described herein may further include operations, features, means, or instructions for determining a number of bits associated with the scheduling information, the number of bits based on one or more CCs associated with the first set of resources, where receiving the scheduling information may be based on determining the number of bits.

In some examples of the method, apparatuses, and non-transitory computer-readable medium described herein, receiving the scheduling information further may include operations, features, means, or instructions for receiving the scheduling information via the downlink control message, where a first field of the downlink control message includes an indication of the first set of resources and a second field of the downlink control message includes the scheduling information.

Some examples of the method, apparatuses, and non-transitory computer-readable medium described herein may further include operations, features, means, or instructions for receiving, prior to receiving the downlink control message, a configuration message to semi-statically configure a length of the downlink control message, where receiving the downlink control message may be based on the length of the downlink control message.

Some examples of the method, apparatuses, and non-transitory computer-readable medium described herein may further include operations, features, means, or instructions for determining a length of the downlink control message based on the one or more sets of resources, where receiving the downlink control message may be based on the length of the downlink control message.

In some examples of the method, apparatuses, and non-transitory computer-readable medium described herein, receiving the scheduling information further may include operations, features, means, or instructions for receiving the scheduling information via a second downlink control message.

Some examples of the method, apparatuses, and non-transitory computer-readable medium described herein may further include operations, features, means, or instructions for determining a length of the second downlink control message based on the first set of resources indicated by the downlink control message, where receiving the second downlink control message may be based on the length of the second downlink control message.

In some examples of the method, apparatuses, and non-transitory computer-readable medium described herein, receiving the downlink control message indicating the status of communication activity further may include operations, features, means, or instructions for receiving an indication that the first set of resources is deactivated.

In some examples of the method, apparatuses, and non-transitory computer-readable medium described herein, receiving the configuration of the one or more sets of resources may include operations, features, means, or instructions for receiving a radio resource control (RRC) message indicating the one or more sets of resources.

In some examples of the method, apparatuses, and non-transitory computer-readable medium described herein, the first set of resources includes downlink SPS resources.

In some examples of the method, apparatuses, and non-transitory computer-readable medium described herein, the first set of resources includes uplink configured grant resources.

A method of wireless communication at a base station is described. The method may include transmitting, to a UE, an indication of a configuration of one or more sets of resources for a set of CCs for communications with the UE, transmitting a downlink control message indicating a first set of resources of the one or more sets of resources based on a status of communication activity for the first set of resources, and communicating with the UE based on the downlink control message and the status of communication activity for the first set of resources.

An apparatus for wireless communication at a base station is described. The apparatus may include a processor, memory coupled with the processor, and instructions stored in the memory. The instructions may be executable by the processor to cause the apparatus to transmit, to a UE, an indication of a configuration of one or more sets of resources for a set of CCs for communications with the UE, transmit a downlink control message indicating a first set of resources of the one or more sets of resources based on a status of communication activity for the first set of resources, and communicate with the UE based on the downlink control message and the status of communication activity for the first set of resources.

Another apparatus for wireless communication at a base station is described. The apparatus may include means for transmitting, to a UE, an indication of a configuration of one or more sets of resources for a set of CCs for communications with the UE, transmitting a downlink control message indicating a first set of resources of the one or more sets of resources based on a status of communication activity for the first set of resources, and communicating with the UE based on the downlink control message and the status of communication activity for the first set of resources.

A non-transitory computer-readable medium storing code for wireless communication at a base station is described. The code may include instructions executable by a processor to transmit, to a UE, an indication of a configuration of one or more sets of resources for a set of CCs for communications with the UE, transmit a downlink control message indicating a first set of resources of the one or more sets of resources based on a status of communication activity for the first set of resources, and communicate with the UE based on the downlink control message and the status of communication activity for the first set of resources.

In some examples of the method, apparatuses, and non-transitory computer-readable medium described herein, transmitting the indication of the configuration of the one or more sets of resources further may include operations, features, means, or instructions for transmitting an indication of the one or more sets of resources for a group of CCs of the set of CCs, where each value of a field of the downlink control message may be associated with a set of the one or more sets of resources.

In some examples of the method, apparatuses, and non-transitory computer-readable medium described herein, transmitting the indication of the configuration of the one or more sets of resources further may include operations, features, means, or instructions for transmitting a list of resources for each CC of the set of CCs, where each combination of a CC of the set and a value of a field of the downlink control message may be associated with a set of the one or more sets of resources.

In some examples of the method, apparatuses, and non-transitory computer-readable medium described herein, transmitting the downlink control message indicating the first set of resources further may include operations, features, means, or instructions for indicating the first set of resources using a value of a field of the downlink control message.

In some examples of the method, apparatuses, and non-transitory computer-readable medium described herein, indicating the first set of resources further may include operations, features, means, or instructions for indicating a first index of a resource of the first set of resources based on the configuration of the one or more sets of resources and the value of the field, where each resource of the first set of resources may be associated with a respective first index indicating a CC of the set of CCs that may be associated with the respective resource, and indicating a second index of the resource based on the configuration of the one or more sets of resources and the value of the field, where each resource of the first set of resources may be associated with a respective second index indicating a respective resource within the associated CC, the second index unique to the associated CC.

In some examples of the method, apparatuses, and non-transitory computer-readable medium described herein, indicating the first index and the second index further may include operations, features, means, or instructions for identifying a CC of the set on used to transmit the downlink control message, and indicating, based on the configuration of the one or more sets of resources, the first index and the second index using a list of indices for the identified CC.

In some examples of the method, apparatuses, and non-transitory computer-readable medium described herein, indicating the first set of resources further may include operations, features, means, or instructions for indicating an index of a resource of the first set of resources based on the configuration of the one or more sets of resources and the value of the field, where each resource of the first set of resources may be associated with a respective index indicating a respective resource, the index global to the set of CCs.

In some examples of the method, apparatuses, and non-transitory computer-readable medium described herein, indicating the index further may include operations, features, means, or instructions for identifying a CC of the set on used to receive the downlink control message, and indicating, based on the configuration of the one or more sets of resources, the index using a list of indices for the identified CC.

In some examples of the method, apparatuses, and non-transitory computer-readable medium described herein, the status of communication activity may be indicative that the first set of resources is activated.

Some examples of the method, apparatuses, and non-transitory computer-readable medium described herein may further include operations, features, means, or instructions for transmitting scheduling information for the first set of resources based on the first set of resources being activated, the scheduling information including a time resource allocation, a frequency resource allocation, a multiplexing scheme, or any combination thereof.

Some examples of the method, apparatuses, and non-transitory computer-readable medium described herein may further include operations, features, means, or instructions for determining a number of bits associated with the scheduling information, the number of bits based on one or more CCs associated with the first set of resources, where transmitting the scheduling information may be based on determining the number of bits.

In some examples of the method, apparatuses, and non-transitory computer-readable medium described herein, transmitting the scheduling information further may include operations, features, means, or instructions for transmitting the scheduling information via the downlink control message, where a first field of the downlink control message includes an indication of the first set of resources and a second field of the downlink control message includes the scheduling information.

Some examples of the method, apparatuses, and non-transitory computer-readable medium described herein may further include operations, features, means, or instructions for transmitting, prior to transmitting the downlink control message, a configuration message to semi-statically configure a length of the downlink control message, where transmitting the downlink control message may be based on the length of the downlink control message.

Some examples of the method, apparatuses, and non-transitory computer-readable medium described herein may further include operations, features, means, or instructions for determining a length of the downlink control message based on the one or more sets of resources, where transmitting the downlink control message may be based on the length of the downlink control message.

In some examples of the method, apparatuses, and non-transitory computer-readable medium described herein, transmitting the scheduling information further may include operations, features, means, or instructions for transmitting the scheduling information via a second downlink control message.

Some examples of the method, apparatuses, and non-transitory computer-readable medium described herein may further include operations, features, means, or instructions for determining a length of the second downlink control message based on the first set of resources indicated by the downlink control message, where transmitting the second downlink control message may be based on the length of the second downlink control message.

In some examples, of the method, apparatuses, and non-transitory computer-readable medium described herein, the status of communication activity may be indicative that the first set of resources is deactivated.

In some examples of the method, apparatuses, and non-transitory computer-readable medium described herein, transmitting the indication of the configuration of the one or more sets of resources may include operations, features, means, or instructions for transmitting an RRC message indicating the one or more sets of resources.

In some examples of the method, apparatuses, and non-transitory computer-readable medium described herein, the first set of resources includes downlink SPS resources.

In some examples of the method, apparatuses, and non-transitory computer-readable medium described herein, the first set of resources includes uplink configured grant resources.

BRIEF DESCRIPTION OF THE DRAWINGS

FIGS. 4A, 4B, 4C, and 4D respectively illustrate examples of resource configurations that support techniques for activation and deactivation of resources configured across multiple CCs in accordance with various aspects of the present disclosure.

DETAILED DESCRIPTION

Figure 1:
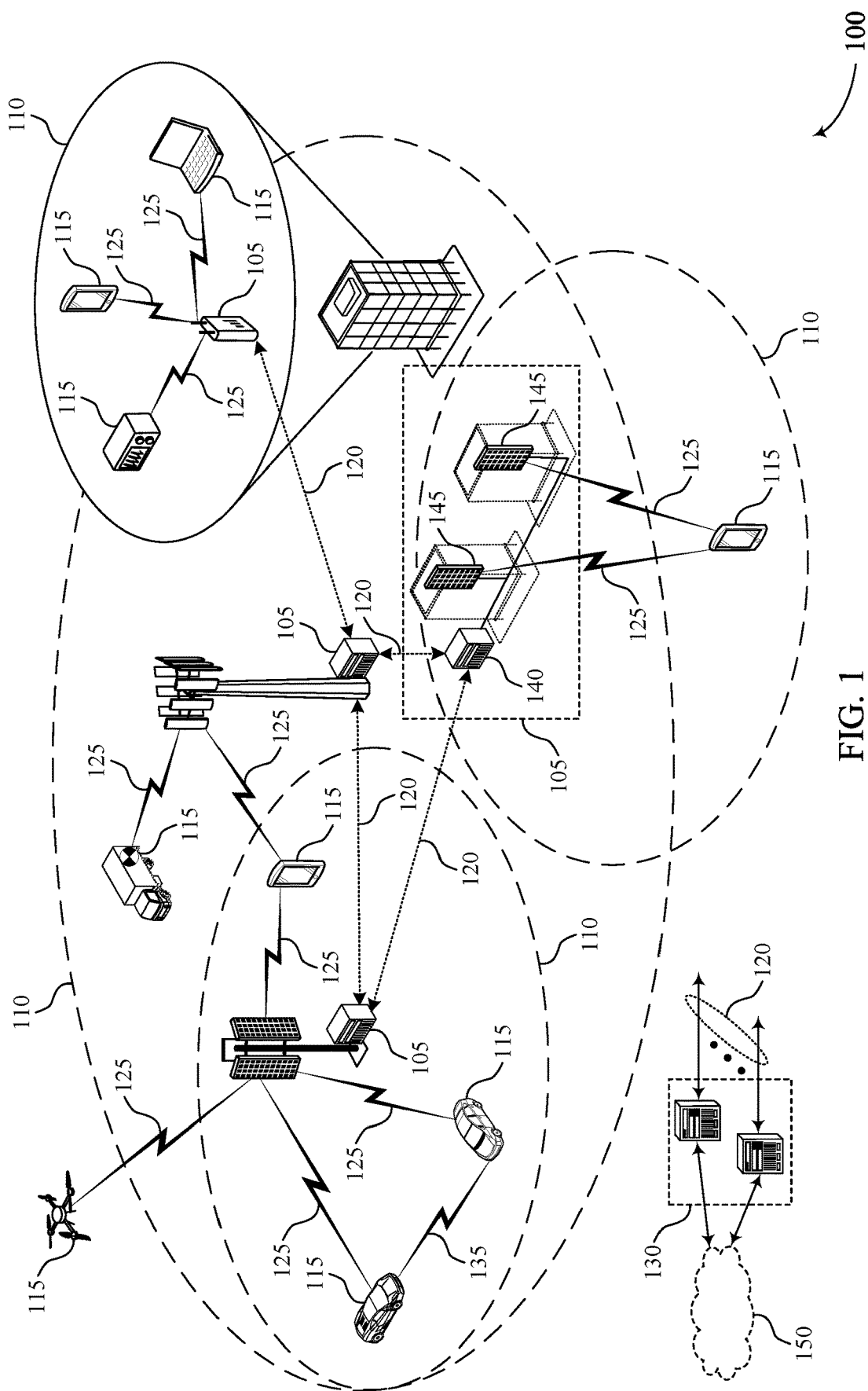
FIG. 1 illustrates an example of a wireless communications system that supports techniques for activation and deactivation of resources configured across multiple component carriers (CCs) in accordance with various aspects of the present disclosure.

A base station may communicate (e.g., in the downlink or the uplink) with a user equipment (UE) over multiple component carriers (CCs), cells, bandwidth parts (BWPs), or the like. While the techniques described herein may be described with reference to one or more CCs, the same techniques may apply to one or more CCs, serving cells, or BWPs, among other examples.

The base station may configure one or more resources (e.g., downlink semi-persistently scheduled (SPS) or uplink configured grants) for communications with the UE. In some cases, the base station may use one downlink control message (e.g., a downlink control information (DCI)) to activate or deactivate one configured resource. In some cases, the base station may use one downlink control message to deactivate multiple configured resources (e.g., multiple downlink SPS or uplink configured grants) on a same CC and at a same time. For example, the base station may configure a table which may indicate an association between a codepoint or field of a downlink control message and a set of multiple configured resources.

In some frequency bandwidths, communication resources may be limited. For example, in dynamic spectrum sharing, communications may be limited to resources that are left unoccupied by communications on another network. Such limitations on resources may limit control channel resources (e.g., overhead resources). Similarly, some overhead communications on the limited resources may increase delays and latency for other communications by occupying resources that may otherwise be used for the other communications (e.g., data communications).

Accordingly, overhead communications may be reduced by using one downlink control message to activate or deactivate multiple configured resources (e.g., multiple downlink SPS or uplink configured grants) across multiple CCs or serving cells. The reduction of overhead may more efficiently utilize available control channel resources and may further reduce delays and communication latency by supporting increased resource availability for other channels or communications.

The base station may determine or identify a resource configuration for one or more sets of configured resources for communication with the UE and may transmit a configuration message to the UE, to indicate the resource configuration to the UE. The resource configuration may include multiple sets of resources, and may include a list or table indicating the multiple sets of resources and an association between each set of resources and a codepoint or field value of a downlink control message. The multiple sets of resources may include downlink SPS resources, uplink configured grant resources, or any combination thereof. The base station may associate the resource configuration with a CC, or may indicate resources within the resource configuration, using one or more techniques described herein.

In an example, the base station may transmit a downlink control message to the UE that includes a field or codepoint to indicate one or more sets of resources that are to be activated or deactivated. In some cases, the downlink control message may also include an indication of whether the one or more sets of resources are to be activated or deactivated (e.g., indicating a status of communication activity for the one or more sets of resources). If the base station is activating the one or more sets of resources, the base station may also transmit scheduling information to the UE via the downlink control message or via a second downlink control message.

The UE may receive the downlink control message and, based on the downlink control message (e.g., based on a value of the field or codepoint), may identify the one or more indicated sets of resources (e.g., a first set of resources). The UE may further determine, based on the downlink control message, whether the one or more sets of resources is being activated or deactivated (e.g., may determine a status of communication activity for the one or more sets of resources). The UE and the base station may communicate based on the one or more activated or deactivated sets of resources, where the one or more sets of resources may include one or more sets of downlink resources (e.g., downlink SPS resources) or one or more sets of uplink resources (e.g., uplink configured grants).

Aspects of the disclosure are initially described in the context of wireless communications systems. Aspects of the disclosure are further illustrated by and described with reference to resource configuration associations, resource configurations, a process flow, apparatus diagrams, system diagrams, and flowcharts that relate to techniques for activation and deactivation of resources configured across multiple CCs.

FIG. 1 illustrates an example of a wireless communications system 100 that supports techniques for activation and deactivation of resources configured across multiple CCs in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell, for example, covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may determine or identify a resource configuration for one or more sets of configured resources for communication with a UE 115. The base station 105 and may transmit a configuration message to the UE 115, indicating the resource configuration. The resource configuration may include multiple sets of resources, and may include a list or table indicating the multiple sets of resources and an association between each set of resources and a codepoint or field value of a downlink control message. The base station may associate the resource configuration with a CC, or may indicate resources within the resource configuration, using one or more techniques described herein.

The base station 105 may transmit a downlink control message to the UE 115 that includes a field or codepoint to indicate one or more sets of resources that are to be activated or deactivated. In some cases, the downlink control message may also include an indication of whether the one or more sets of resources are to be activated or deactivated (e.g., indicating a status of communication activity for the one or more sets of resources). The UE 115 may receive the downlink control message and, based on the downlink control message (e.g., based on a value of the field or codepoint), may identify the one or more indicated sets of resources. The UE 115 may further determine, based on the downlink control message, whether the one or more sets of resources is being activated or deactivated. The UE 115 and the base station 105 may communicate based on the one or more activated or deactivated sets of resources, where the one or more sets of resources may include one or more sets of downlink resources (e.g., downlink SPS) or one or more sets of uplink resources (e.g., uplink configured grants).

Figure 2:
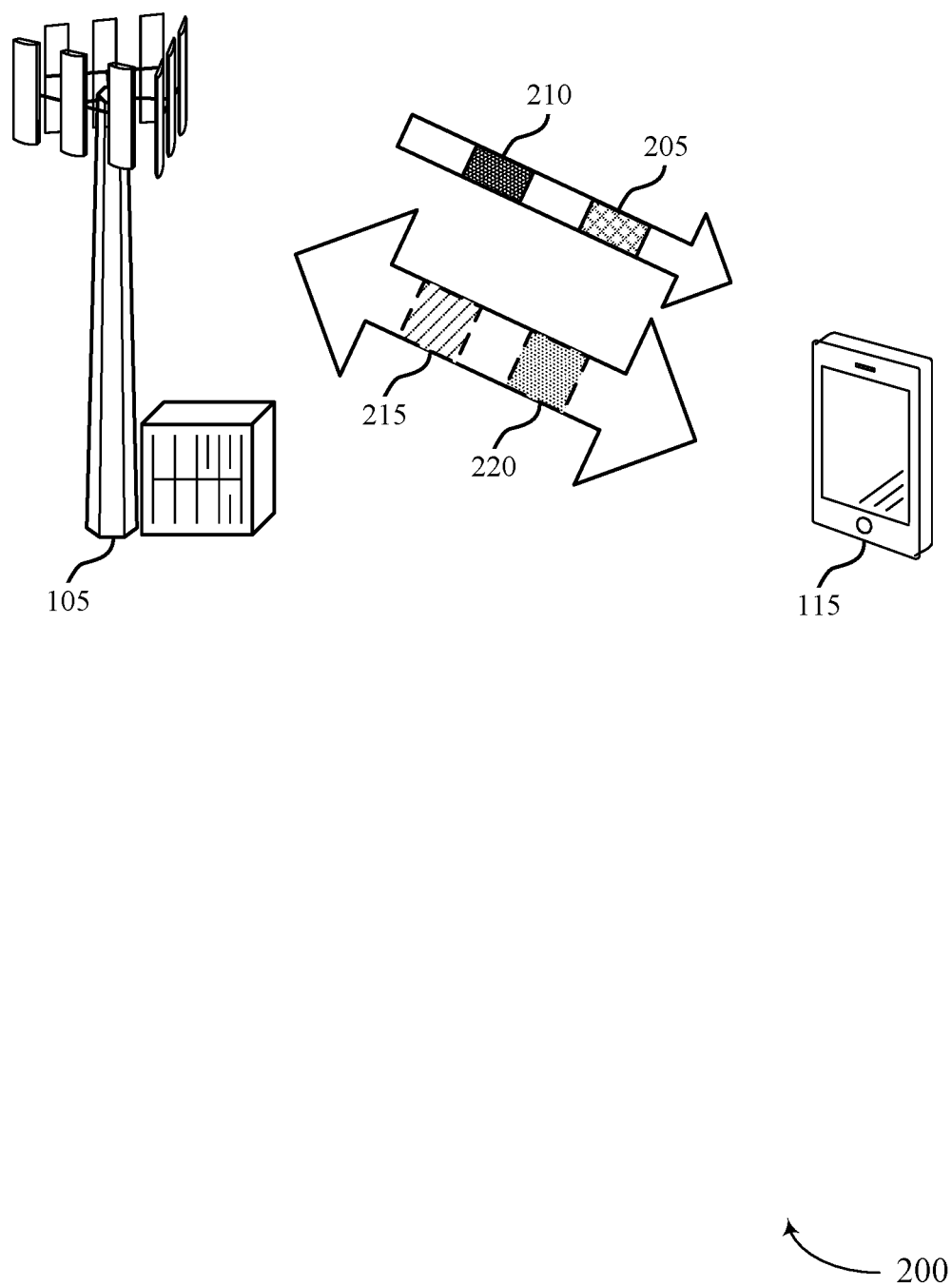
FIG. 2 illustrates an example of a wireless communications system that supports techniques for activation and deactivation of resources configured across multiple CCs in accordance with various aspects of the present disclosure.

FIG. 2 illustrates an example of a wireless communications system 200 that supports techniques for activation and deactivation of resources configured across multiple CCs in accordance with various aspects of the present disclosure. In some examples, wireless communications system 200 may implement aspects of wireless communications system 100. For example, wireless communications system 200 may include a base station 105 and a UE 115, which may represent examples of a base station 105 and a UE 115 as described with reference to FIG. 1. The base station 105 may communicate (e.g., in the downlink or the uplink) with the UE 115 over multiple CCs, multiple cells, multiple BWPs, or the like.

The base station 105 may further configure one or more resources (e.g., downlink SPS or uplink configured grants) for communications with the UE 115. For example, multiple downlink SPS or multiple uplink configured grants may be configured on a serving cell (e.g., CC) of the base station 105. In some cases, the base station 105 may use one downlink control message 210 (e.g., DCI) to activate or deactivate one resource (e.g., one downlink SPS or one type 2 uplink configured grant). In some cases, the base station 105 may use one downlink control message 210 to deactivate multiple resources (e.g., multiple downlink SPS or uplink configured grants) on a same serving cell (e.g., a CC) at a same time. For example, the base station 105 may configure a table (e.g., via RRC signaling) which may indicate an association between a codepoint or field of a downlink control message 210 and a set of multiple resources.

In some frequency bandwidths, such as NR bandwidths that may share a frequency spectrum with LTE (e.g., dynamic spectrum sharing), communication resources may be limited. For example, in dynamic spectrum sharing, NR communications may be limited to use resources that are left unoccupied by LTE communications. Such limitations on resources may limit control channel (e.g., physical downlink control channel (PDCCH)) resources available for NR communications. Similarly, some overhead communications on the limited resources may increase delays and latency by taking resources that may otherwise be used for other communications (e.g., data communications).

Overhead communications (e.g., PDCCH overhead) may be reduced by using one downlink control message 210 to activate or deactivate multiple configured resources (e.g., multiple downlink SPS or uplink configured grants) across multiple CCs or serving cells. The reduction of overhead may more efficiently utilize available control channel resources and may further reduce delays and communication latency by supporting increased resource availability for other channels or communications.

The base station 105 may determine or identify a resource configuration for one or more sets of configured resources for communication with the UE 115 and may transmit a configuration message 205 (e.g., an RRC message) to the UE 115, to indicate the resource configuration to the UE 115. The resource configuration may include multiple sets of resources, and may include a list or table indicating the multiple sets of resources and an association between each set of resources and a codepoint or field value of a downlink control message 210. The multiple sets of resources may include downlink SPS resources, uplink configured grant resources, or any combination thereof. Examples of different resource configurations are described herein with reference to FIGS. 4A-4D.

For example, in some cases, a resource configuration may represent a resource configuration for a group of CCs (e.g., group of cells) and may include sets of resources and associated codepoint values that apply to the group of CCs. In some cases, a resource configuration may represent a resource configuration for a single CC (e.g., a single cell) and may include sets of resources and associated codepoint values that apply to the single CC. In some examples, a resource configuration may indicate a resource using a resource identifier (ID) that is unique to a CC, and may also indicate the CC associated with the resource (e.g., may indicate the CC index). In some other examples, a resource configuration may indicate a resource using a resource ID that is global to all of the CCs associated with the resource configuration, and may omit an indication of the CC associated with the resource (e.g., omit the CC index).

The base station 105 may transmit a downlink control message 210 to the UE 115 that includes a field or codepoint to indicate one or more sets of resources that are to be activated or deactivated. In some cases, the downlink control message may also include an indication of whether the one or more sets of resources are to be activated or deactivated. Activation or deactivation of a set of resources may be associated with or correspond to a status of communication activity on the set of resources. For example, if a set of resources is activated, its status of communication activity may be an activated status, while if a set of resources is deactivated, its status of communication activity may be a deactivated status.

If the base station 105 is activating the one or more sets of resources, the base station 105 may also transmit scheduling information to the UE 115 in the downlink control message 210 or in a second downlink control message associated with the downlink control message 210 (e.g., in a second-stage DCI). The scheduling information may include time domain resource allocation (e.g., one or more symbols), frequency domain resource allocation (e.g., one or more resource blocks (RBs)), one or more multiplexing schemes (e.g., MIMO schemes), or any combination thereof, associated with the one or more sets of resources (e.g., among other examples).

The UE 115 may receive the downlink control message 210 and, based on the downlink control message 210 (e.g., based on a value of a field or codepoint), may identify the one or more indicated sets of resources (e.g., a first set of resources). The UE 115 may further determine, based on the downlink control message 210, whether the one or more sets of resources is being activated or deactivated (e.g., may determine a status of communication activity for the one or more sets of resources). The UE 115 and the base station 105 may communicate based on the one or more activated or deactivated sets of resources.

The one or more sets of resources may include one or more sets of downlink resources 215 (e.g., downlink SPS) or one or more sets of uplink resources 220 (e.g., uplink configured grants). If the one or more sets of resources are activated, the base station 105 and the UE 115 may communicate on the one or more sets of resources (e.g., downlink resources 215 or uplink resources 220). Similarly, if the one or more sets of resources are deactivated, the base station 105 and the UE 115 may refrain from communicating on the one or more sets of resources (e.g., downlink resources 215 or uplink resources 220).

Figure 3A:
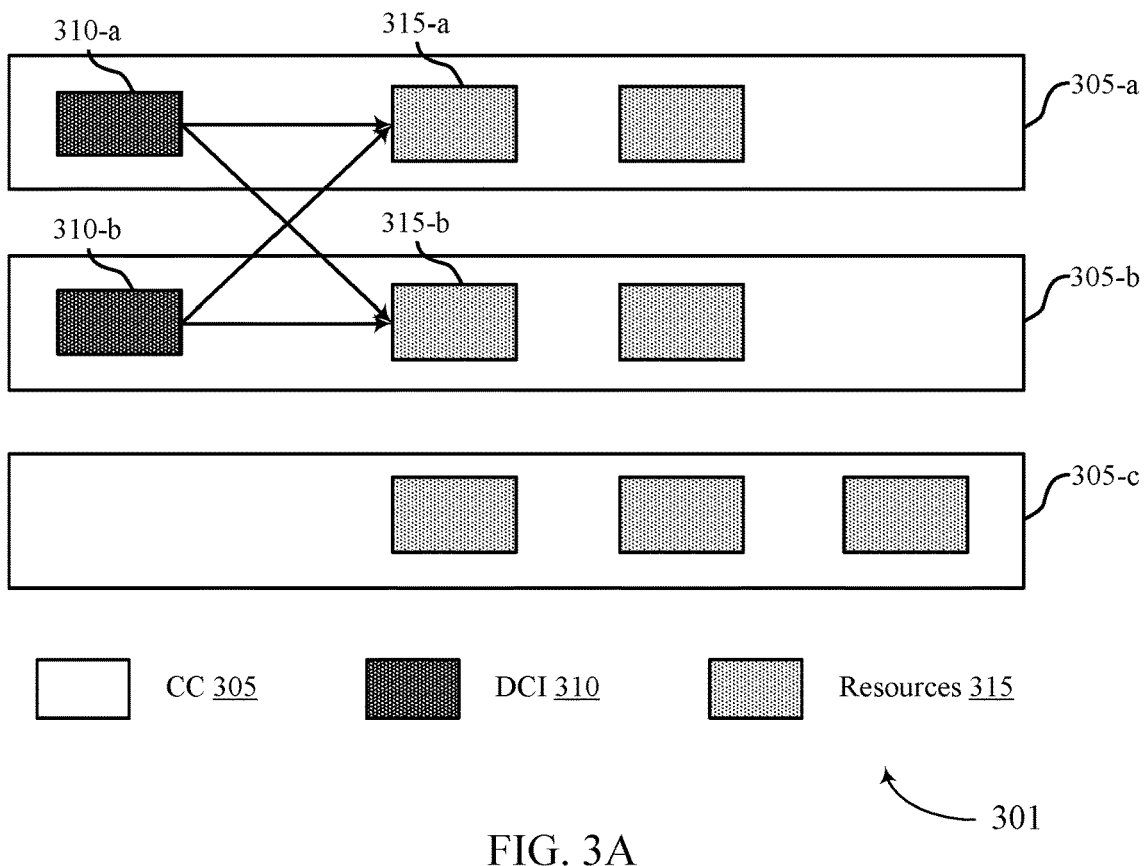
FIGS. 3A and 3B respectively illustrate examples of resource configuration associations that support techniques for activation and deactivation of resources configured across multiple CCs in accordance with various aspects of the present disclosure.
Figure 3B:
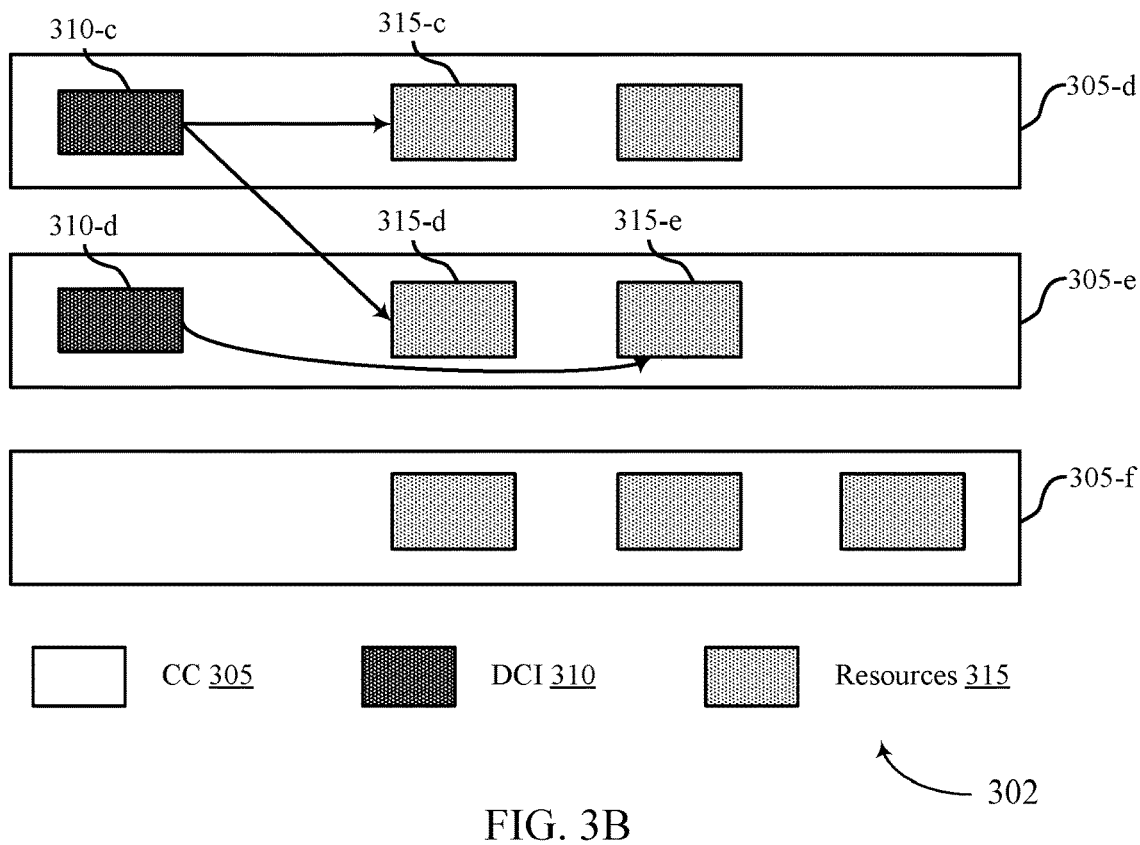

FIGS. 3A and 3B respectively illustrate examples of resource configuration associations 301 and 302 that support techniques for activation and deactivation of resources configured across multiple CCs in accordance with various aspects of the present disclosure. In some examples, resource configuration associations 301 and 302 may implement aspects of wireless communications systems 100 or 200. For example, resource configuration associations 301 and 302 may represent resource associations configured by a base station 105 for communications with a UE 115 using configured resources (e.g., downlink SPS or uplink configured grants), where the UE 115 and the base station 105 may be examples of a UE 115 and a base station 105 described with reference to FIGS. 1 and 2. The UE 115 may use resource configuration associations 301 and 302 to identify a set of resources that is activated or deactivated by the base station 105.

For example, resource configuration associations 301 and 302 may represent associations between a value of a field or codepoint of a downlink control message (e.g., a DCI) and one or more resources in a set of resources. Such associations may be based on a resource configuration transmitted from the base station 105 to the UE 115. As described with reference to FIG. 2, in some cases, a resource configuration may represent a resource configuration for a group of CCs 305, serving cells, BWPs, or the like. Such a resource configuration may include sets of resources and associated codepoint values that apply to downlink control messages received on the group of CCs 305, serving cells, or BWPs. For example, downlink control messages received on different CCs 305 may be associated with a same codepoint-to-resource association to identify activated or deactivated resources. Resource configuration association 301 may represent associations configured by a resource configuration for a group of CCs 305.

In some cases, a resource configuration may represent a resource configuration for a single CC 305, serving cell, BWP, or the like. The resource configuration may include sets of resources and associated codepoint values that apply to downlink control messages received on the single CC 305, serving cell, or BWP. Resource configuration association 302 may represent associations configured by a resource configuration for a single CC 305. Although the resource configuration may apply to a single CC 305, the resources indicated using the resource configuration may be associated with multiple CCs 305. While the examples described herein, or illustrated in FIG. 3A and FIG. 3B, describe CCs 305, the same examples may apply to serving cells, BWPs, or the like.

In the example of resource configuration association 301, the resource configuration transmitted by the base station 105 may include a list or table of sets of resources that are jointly configured for a group of CCs 305. Because the resources are configured for the group of CCs 305, a same value of a field or codepoint in a downlink control message on any CC 305 of the group of CCs 305 may point to a same set of resources (e.g., regardless of a CC 305 the downlink control message is received on). In one such example, a list or table of sets of SPS resources may be configured for a group of downlink CCs 305, and a DCI codepoint (e.g., having a value of '01') for a DCI received on any CC 305 of the group may point to a same set of SPS resources.

In one example of resource configuration association 301, a list or table of sets of resources may be jointly configured for a group of CCs 305 that includes CC 305-a, CC 305-b, and CC 305-*c* (e.g., among other CCs 305). A downlink control message 310-*a* communicated on CC 305-*a* may include a field (e.g., a value of the field) indicating a set of resources to be activated or deactivated. In one example, the field (e.g., having a value of '01') may indicate that the set of resources includes resources 315-*a* and resources 315-*b*. In some cases, resources 315-*a* and 315-*b* may represent downlink SPS resources configured on CC 305-*a* and CC 305-*b*, respectively. In some cases, resources 315-*a* and 315-*b* may represent uplink configured grant resources configured on CC 305-*a* and CC 305-*b*, respectively. A downlink control message 310-*b* received on CC 305-*b* may similarly include a field indicating a set of resources to be activated or deactivated. If the field of downlink control message 310-*b* has a same value as the field of downlink control message 310-*a* (e.g., a value of '01'), downlink control message 310-*b* may indicate the same set of resources as downlink control message 310-*a* (e.g., resources 315-*a* and 315-*b*).

In the example of resource configuration association 302, the resource configuration transmitted by the base station 105 may include lists or tables of sets of resources that are each separately configured for a single CC. For example, the base station 105 may configure a separate table or list of sets of resources for each CC used for communications with the UE 115. The UE 115 may determine which table or list to use in association with a downlink control message based on the CC associated with the received downlink control message. Because the list or table of resources is configured for the single CC, a same value of a field or codepoint in a downlink control message on different CCs 305 may point to different sets of resources. In one such example, lists or tables of sets of SPS resources may be separately configured for each downlink CC, and a DCI codepoint (e.g., having a value of '01') for a DCI received on two different CCs 305 of the group may point to different sets of SPS resources.

In one example of resource configuration association 302, lists or tables of sets of resources may be separately configured for each of CC 305-*d*, CC 305-*e*, and CC 305-*f* (e.g., among other CCs 305). A downlink control message 310-*c* communicated on CC 305-*d* may include a field (e.g., a value of the field) indicating a first set of resources to be activated or deactivated. In one example, the field (e.g., having a value of '01') may indicate that the set of resources includes resources 315-*c* and resources 315-*d*. Resources 315-*c* may be associated with CC 305-*d* and resources 315-*d* may be associated with CC 305-*e*. A downlink control message 310-*d* received on CC 305-*e* may similarly include a field indicating a set of resources to be activated or deactivated. The field of downlink control message 310-*d* may have a same value as the field of downlink control message 310-*c* (e.g., a value of '01'), but may be associated with (e.g., indicate) a different set of resources than downlink control message 310-*c*. For example, downlink control message 310-*d* (e.g., a value of a field of downlink control message 310-*d*) may indicate resources 315-*e*.

FIGS. 4A, 4B, 4C, and 4D respectively illustrate examples of resource configurations 401, 402, 403, and 404 that support techniques for activation and deactivation of resources configured across multiple CCs in accordance with various aspects of the present disclosure. In some examples, resource configurations 401, 402, 403, and 404 may implement aspects of wireless communications systems 100 or 200. For example, a base station 105 may identify or determine the resource configurations for communications with a UE 115 and may transmit the resource configurations to the UE 115, where the base station 105 and the UE 115 may be examples of a base station and a UE 115 described with reference to FIGS. 1-3.

Resource configurations 401, 402, 403, and 404 may also implement aspects of resource configuration association 301 or resource configuration association 302. For example, resource configuration 401 and resource configuration 402 may correspond to resource configuration association 301, where a resource configuration may apply jointly to a group of CCs, serving cells, BWPs, or the like. For example, resource configuration 401 or resource configuration 402 may apply to each CC of a group of CCs. Resource configuration 403 and resource configuration 404 may correspond to resource configuration association 302, where a separate resource configuration may apply to each CC, serving cell, BWP, or the like. For example, a table 415-*a* or table 415-*c* of resource configuration 403 or resource configuration 404, respectively, may apply to a first CC (e.g., to downlink control messages on the first CC), while a table 415-*b* or 415-*d* of resource configuration 403 or resource configuration 404, respectively, may apply to a second CC (e.g., to downlink control messages on the second CC). While the examples described herein or illustrated with respect to FIG. 4A, FIG. 4B, FIG. 4C, and FIG. 4D describe CCs, the same examples may apply to serving cells, BWPs, or the like.

A resource configuration, as described with respect to FIG. 2, FIG. 3A, and FIG. 3B, may include a list of resources 410 (e.g., sets of resources 410) and associated values of a codepoint 405 (e.g., field) of a downlink control message. Resources indicated in the tables illustrated in FIG. 4A, FIG. 4B, FIG. 4C, or FIG. 4D may be indicated by an abbreviation 'RS.' The resources, for example, may be downlink SPS resources, uplink configured grant resources, or any combination thereof. In some cases, the resources 410 may be indicated using an index that is unique for a CC (e.g., but not across CCs), as described with reference to FIG. 2, such that the base station 105 may indicate resources 410 within a set using a resource index and a CC index. For example, resource configuration 401 and resource configuration 403 may represent resource configurations that include a resource index (e.g., a downlink SPS index or an uplink configured grant index) and a CC index. Resource configuration 401 and resource configuration 403 may indicate resources 410 in a set using a first index indicating a CC associated with the resources 410 and a second index indicating the resources within the CC.

In some cases, the resources 410 may be indicated using an index that applies to all CCs used for communications between the base station 105 and the UE 115 (e.g., a global index), as described with reference to FIG. 2, such that the base station 105 may indicate resources 410 within a set using a resource index (e.g., a downlink SPS index or an uplink configured grant index). For example, resource configuration 402 and resource configuration 404 may represent resource configurations that include a resource index. Resource configuration 402 and resource configuration 404 may indicate resources 410 in a set using an index indicating resources 410 on a CC or across multiple CCs. For example, a resource index may indicate first resources 410 on a single CC, or may indicate first resources 410 on a first CC and second resources 410 on a second CC (e.g., among other resources 410). Combinations of resource indices may indicate the resources 410 associated with the respective indices.

Figure 5:
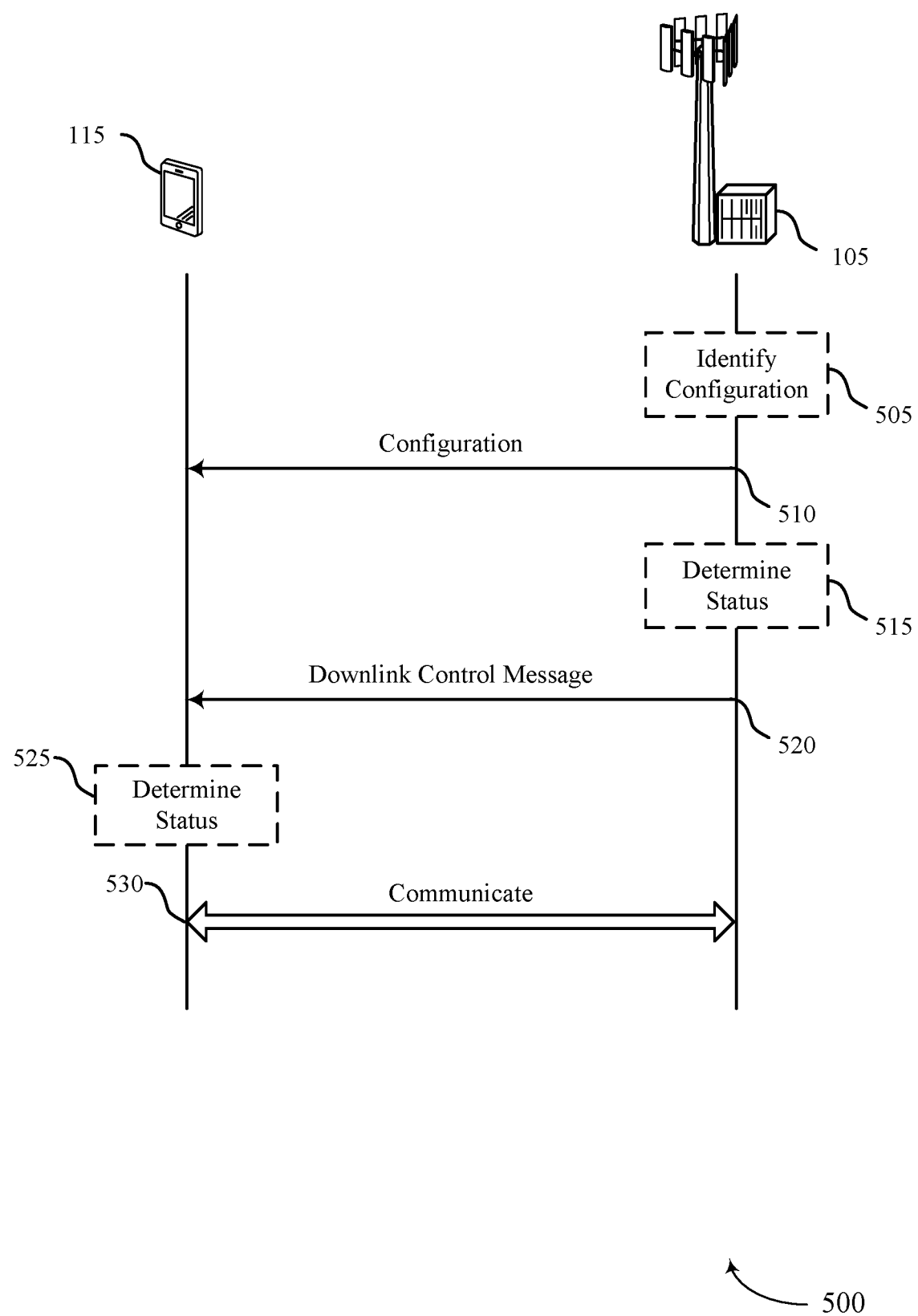
FIG. 5 illustrates an example of a process flow that supports techniques for activation and deactivation of resources configured across multiple CCs in accordance with various aspects of the present disclosure.

FIG. 5 illustrates an example of a process flow 500 that supports techniques for activation and deactivation of resources configured across multiple CCs in accordance with various aspects of the present disclosure. In some examples, process flow 500 may implement or be implemented by aspects of wireless communications systems 100 or 200. Similarly, process flow 500 may implement or be implemented by aspects of resource configuration associations 301 or 302 or resource configurations 401, 402, 403, or 404. For example, process flow 500 may be implemented by a UE 115 and a base station 105, which may be examples of a UE 115 and a base station 105 described with reference to FIGS. 1-4. Process flow 500 may be implemented by the UE 115 and the base station 105 to activate or deactivate configured resources for communication between the UE 115 and the base station 105.

In the following description of process flow 500, the operations between the UE 115 and the base station 105 may be transmitted in a different order than the order shown, or the operations performed by the UE 115 or the base station 105 may be performed in different orders or at different times. Specific operations may also be left out of process flow 500, or other operations may be added to process flow 500. Although the UE 115 and the base station 105 are shown performing the operations of process flow 500, some aspects of some operations may also be performed by one or more other wireless devices.

At 505, the base station 105 may, in some cases, identify a configuration of one or more sets of resources for multiple CCs for communications with the UE 115. For example, a set of the one or more sets of resources may include resources on multiple CCs that are configured for communications with the UE 115. The identified configuration may include the one or more sets of resources and may include an association between each of the one or more sets and a value of a codepoint or field for indicating a set of the one or more sets of resources. In some cases, the association between sets of resources and codepoint values may be included in a table or list. In some cases, as described with reference to FIGS. 2-4, the configuration may include a separate table or list for each CC used for communications with the UE 115, or in some cases, the configuration may include a table or list for a group of CCs. In some examples, as described with reference to FIGS. 2 and 4, the configuration may indicate a resource of a set of resources using a resource index and a CC index, and in some examples, the configuration may indicate a resource of a set of resources using a global resource index.

At 510, the base station 105 may transmit, to the UE 115, an indication of the configuration of the one or more sets of resources. For example, the base station 105 may transmit an RRC configuration (e.g., an RRC configuration message) to the UE 115, which may indicate the configuration of the one or more sets of resources. In some cases, the indication of the configuration may include one or more tables or lists indicating the one or more sets of resources and associated codepoint values. In some cases, the indication of the configuration may include an indication of one or more tables or lists stored at the UE 115, where the one or more tables or lists include the one or more sets of resources and associated codepoint values.

At 515, the base station 105 may, in some cases, determine a status of communication activity for a first set of resources of the one or more sets of resources. For example, the base station 105 may determine to activate the first set of resources or may determine to deactivate the first set of resources. The first set of resources may include one or more downlink resources (e.g., downlink SPS), uplink resources (e.g., uplink configured grants), or any combination thereof.

At 520, the base station 105 may transmit, to the UE 115, a downlink control message (e.g., a DCI) indicating the communication activity for the first set of resources, based on the determined status of communication activity. The downlink control message may include an explicit field or codepoint, the value of which may indicate the first set of resources. In some cases, the field used to indicate the first set of resources may be a HARQ process ID field, a carrier indicator field, or any combination thereof. In some cases, the downlink control message may also indicate whether the first set of resources is activated or deactivated (e.g., via a field or a value of a field).

If the base station 105 activates the one or more sets of resources, the base station 105 may also transmit scheduling information to the UE 115 in the downlink control message or in a second downlink control message associated with the downlink control message (e.g., in a second-stage DCI), as described with reference to FIG. 2. A number of bits used to indicate the scheduling information for one resource, or one set of resources, may be based on a CC associated with the resource or set of resources. For example, a number of bits used to indicate scheduling information for a resource associated with a first CC may be different than a number of bits used to indicate scheduling information for a resource associated with a second CC. In some cases, the number of bits may be based on one or more shared channel configurations (e.g., a physical downlink shared channel (PDSCH) or physical uplink shared channel (PUSCH) configuration) for a corresponding CC.

If the scheduling information is included in the downlink control message, the scheduling information for each resource may be indicated in one or more separate fields of the downlink control message. In some cases, the scheduling information for a resource may include multiple fields of the downlink control message. In some cases, a number of activated resources may vary (e.g., depending on which configured set of resources is activated), such that a length or size of the downlink control message may also vary (e.g., in order to include the scheduling information for each resource. The base station 105 may semi-statically configure the length or size of the downlink control message to the UE 115 (e.g., via an RRC configuration). Additionally or alternatively, the UE 115 may implicitly determine (e.g., compute) a length or size of the downlink control message based on a maximum length or size for all configured resource sets. For example, the UE 115 may attempt to decode the downlink control message based on a length or size of a downlink control message associated with a largest set of resources.

If the scheduling information is included in the second downlink control message, a payload size (e.g., length or number of bits) of the second downlink control message may be determined based on the first set of resources indicated in the downlink control message. The UE 115 may determine the length or size of the second downlink control message using the first set of resources. In an example, each resource may correspond to ten bits of scheduling information. If the first set of resources includes three resources, the UE 115 may determine that the size or length of the second downlink control message is 30 bits. Similarly, if the first set of resources includes one resource, the UE 115 may determine that the size or length of the second downlink control message is ten bits.

At 525, in some cases, the UE 115 may determine the status of communication activity on the first set of resources. For example, the UE 115 may identify the first set of resources using the configuration from the base station 105 and a value of the field or codepoint of the downlink control message, as described with reference to FIGS. 3 and 4. In some cases, the UE 115 may also identify a status (e.g., an activated or deactivated status) of the first set of resources based on a value of a field or codepoint of the downlink control message.

At 530, the UE 115 and the base station 105 may communicate based on the downlink control message and the status of communication activity for the first set of resources. For example, the UE 115 may identify that the first set of resources is deactivated and may refrain from using the first set of resources for communications with the base station 105. In some cases, the UE 115 may identify that the first set of resources is activated and may use the first set of resources for communications with the base station 105. The communications may include downlink communications (e.g., via downlink SPS) or may include uplink communications (e.g., via uplink configured grants).

Figure 6:
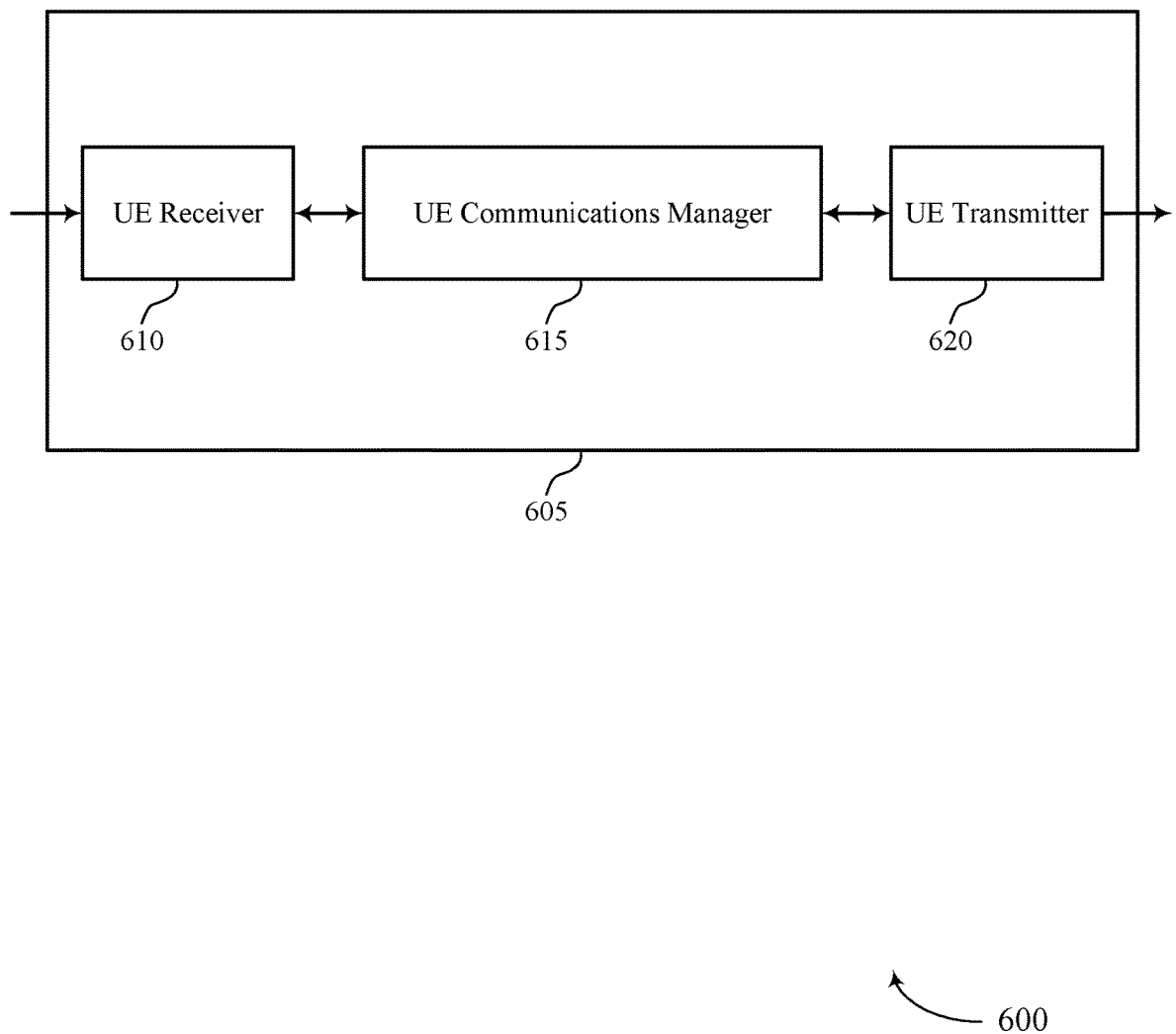
FIG. 6 shows a block diagram of a device that supports techniques for activation and deactivation of resources configured across multiple CCs in accordance with various aspects of the present disclosure

FIG. 6 shows a block diagram 600 of a device 605 that supports techniques for activation and deactivation of resources configured across multiple CCs in accordance with various aspects of the present disclosure. The device 605 may be an example of aspects of a UE 115 as described herein. The device 605 may include a UE receiver 610, a UE communications manager 615, and a UE transmitter 620. The device 605 may also include a UE processor. Each of these components may be in communication with one another (e.g., via one or more UE buses).

The UE receiver 610 may receive information such as packets, user data, or control information associated with various information channels (e.g., control channels, data channels, and information related to techniques for activation and deactivation of resources configured across multiple CCs, etc.). Information may be passed on to other components of the device 605. The UE receiver 610 may be an example of aspects of the UE transceiver 920 described with reference to FIG. 9. The UE receiver 610 may utilize a single UE antenna or a set of UE antennas.

The UE communications manager 615 may receive, from a base station, a configuration of one or more sets of resources for multiple CCs for communications with the base station, receive a downlink control message indicating a status of communication activity on a first set of resources of the one or more sets of resources, and communicate with the base station based on the status of communication activity on the first set of resources. The UE communications manager 615 may be an example of aspects of the UE communications manager 910 described herein.

The UE communications manager 615, or its sub-components, may be implemented in hardware, code (e.g., software or firmware) executed by a UE processor, or any combination thereof. If implemented in code executed by a UE processor, the functions of the UE communications manager 615, or its sub-components may be executed by a general-purpose UE processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a UE transceiver, a network server, another computing device, one or more other components described in the present disclosure, or a combination thereof in accordance with various aspects of the present disclosure.

The UE transmitter 620 may transmit signals generated by other components of the device 605. In some examples, the UE transmitter 620 may be collocated with a UE receiver 610 in a UE transceiver component. For example, the UE transmitter 620 may be an example of aspects of the UE transceiver 920 described with reference to FIG. 9. The UE transmitter 620 may utilize a single UE antenna or a set of UE antennas.

The actions performed by the UE communications manager 615, among other examples herein, as described herein may be implemented to realize one or more potential advantages. For example, UE communications manager 615 may decrease communication delays and latency, and increase available power at a wireless device (e.g., a UE 115) by enabling activation or deactivation of multiple configured resources across multiple CCs. The activation and deactivation of such resources may reduce overhead resource use or reduce power consumption at a device (or any combination thereof) compared to other systems and techniques, for example, that do not support activation or deactivation of multiple configured resources across multiple CCs. Accordingly, UE communications manager 615 may save power and increase battery life at a wireless device (e.g., a UE 115) by strategically reducing an amount of signaling or processing performed by a wireless device (e.g., a UE 115).

Figure 7:
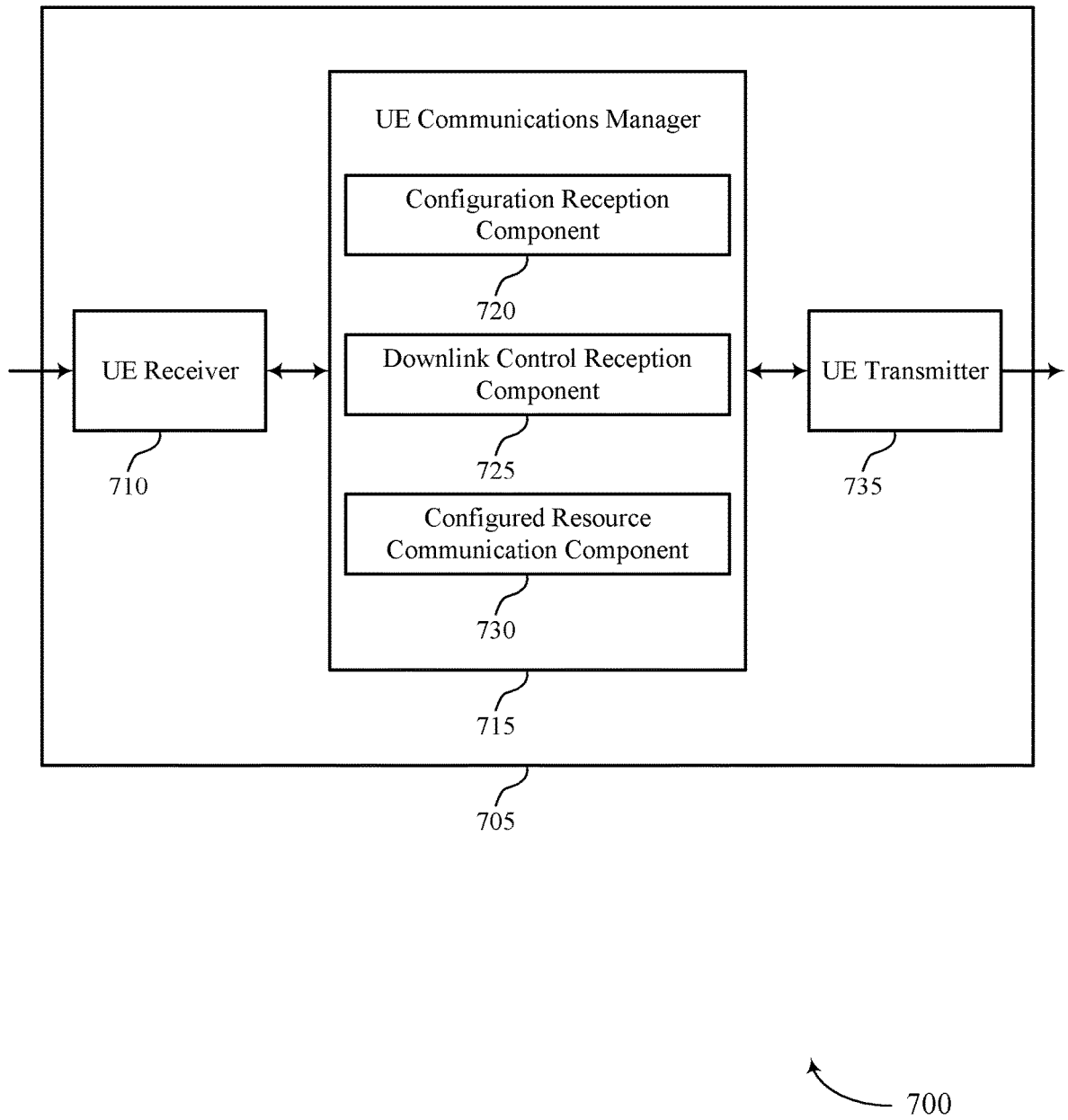
FIG. 7 shows a block diagram of a device that supports techniques for activation and deactivation of resources configured across multiple CCs in accordance with various aspects of the present disclosure.

FIG. 7 shows a block diagram 700 of a device 705 that supports techniques for activation and deactivation of resources configured across multiple CCs in accordance with various aspects of the present disclosure. The device 705 may be an example of aspects of a device 605, or a UE 115 as described herein. The device 705 may include a UE receiver 710, a UE communications manager 715, and a UE transmitter 735. The device 705 may also include a UE processor. Each of these components may be in communication with one another (e.g., via one or more UE buses).

The UE receiver 710 may receive information such as packets, user data, or control information associated with various information channels (e.g., control channels, data channels, and information related to techniques for activation and deactivation of resources configured across multiple CCs, etc.). Information may be passed on to other components of the device 705. The UE receiver 710 may be an example of aspects of the UE transceiver 920 described with reference to FIG. 9. The UE receiver 710 may utilize a single UE antenna or a set of UE antennas.

The UE communications manager 715 may be an example of aspects of the UE communications manager 615 as described herein. The UE communications manager 715 may include a configuration reception component 720, a downlink control reception component 725, and a configured resource communication component 730. The UE communications manager 715 may be an example of aspects of the UE communications manager 910 described herein.

The configuration reception component 720 may receive, from a base station, a configuration of one or more sets of resources for multiple CCs for communications with the base station. The downlink control reception component 725 may receive a downlink control message indicating a status of communication activity on a first set of resources of the one or more sets of resources. The configured resource communication component 730 may communicate with the base station based on the status of communication activity on the first set of resources.

The UE transmitter 735 may transmit signals generated by other components of the device 705. In some examples, the UE transmitter 735 may be collocated with a UE receiver 710 in a UE transceiver component. For example, the UE transmitter 735 may be an example of aspects of the UE transceiver 920 described with reference to FIG. 9. The UE transmitter 735 may utilize a single UE antenna or a set of UE antennas.

A UE processor of a wireless device (e.g., controlling the UE receiver 710, the UE transmitter 735, or the UE transceiver 920 as described with reference to FIG. 9) may increase communication reliability and accuracy by decreasing communication delays and increasing available power. The reduced delays may reduce energy consumption (e.g., via implementation of system components described with reference to FIG. 8) compared to other systems and techniques, for example, that do not support activation or deactivation of multiple configured resources across multiple CCs, which may increase processing or signaling overhead and power consumption. Further, the processor of the UE 115 may identify one or more aspects of a resource configuration to perform the techniques described herein. The processor of the wireless device may use the resource configuration to perform one or more actions that may result in lower delays and power consumption, as well as save power and increase battery life at the wireless device (e.g., by receiving a single message to activate or deactivate multiple configured resources across multiple CCs), among other benefits.

Figure 8:
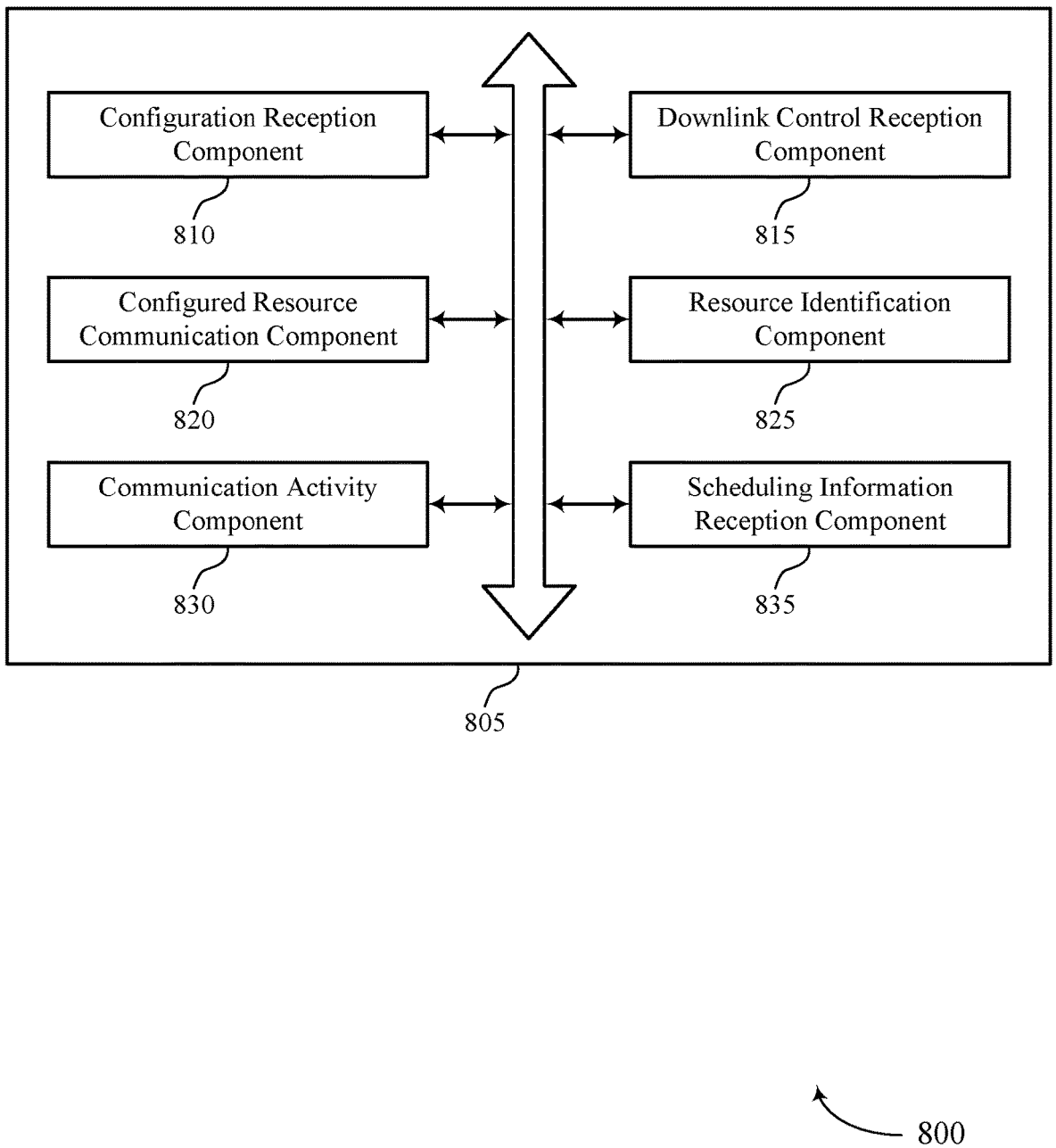
FIG. 8 shows a block diagram of a user equipment (UE) communications manager that supports techniques for activation and deactivation of resources configured across multiple CCs in accordance with various aspects of the present disclosure.

FIG. 8 shows a block diagram 800 of a UE communications manager 805 that supports techniques for activation and deactivation of resources configured across multiple CCs in accordance with various aspects of the present disclosure. The UE communications manager 805 may be an example of aspects of a UE communications manager 615, a UE communications manager 715, or a UE communications manager 910 described herein. The UE communications manager 805 may include a configuration reception component 810, a downlink control reception component 815, a configured resource communication component 820, a resource identification component 825, a communication activity component 830, and a scheduling information reception component 835. Each of these components may communicate, directly or indirectly, with one another (e.g., via one or more UE buses).

The configuration reception component 810 may receive, from a base station, a configuration of one or more sets of resources for multiple CCs for communications with the base station. In some examples, the configuration reception component 810 may receive an indication of the one or more sets of resources for a group of CCs of the multiple CCs, where each value of a field of the downlink control message is associated with a set of the one or more sets of resources. In some examples, the configuration reception component 810 may receive a list of resources for each CC of the multiple CCs, where each combination of a CC of the set and a value of a field of the downlink control message is associated with a set of the one or more sets of resources. In some examples, the configuration reception component 810 may receive an RRC message indicating the one or more sets of resources.

The downlink control reception component 815 may receive a downlink control message indicating a status of communication activity on a first set of resources of the one or more sets of resources.

The configured resource communication component 820 may communicate with the base station based on the status of communication activity on the first set of resources. In some cases, the first set of resources includes downlink SPS resources. In some cases, the first set of resources includes uplink configured grant resources.

The resource identification component 825 may identify a field of the downlink control message that indicates the first set of resources, where the status of communication activity is based on identifying the field. In some examples, the resource identification component 825 may identify the first set of resources based on a value of the field, where the status of communication activity is based on identifying the first set of resources. In some examples, the resource identification component 825 may determine a first index of a resource of the first set of resources based on the configuration of the one or more sets of resources and the value of the field, where each resource of the first set of resources is associated with a respective first index indicating a CC of the multiple CCs that is associated with the respective resource.

In some examples, the resource identification component 825 may determine a second index of the resource based on the configuration of the one or more sets of resources and the value of the field, where each resource of the first set of resources is associated with a respective second index indicating a respective resource within the associated CC, the second index unique to the associated CC. In some examples, the resource identification component 825 may identify a CC of the set used to receive the downlink control message. In some examples, the resource identification component 825 may determine, based on the configuration of the one or more sets of resources, the first index and the second index using a list of indices for the identified CC.

In some examples, the resource identification component 825 may determine an index of a resource of the first set of resources based on the configuration of the one or more sets of resources and the value of the field, where each resource of the first set of resources is associated with a respective index indicating a respective resource, the index global to the multiple CCs. In some examples, the resource identification component 825 may determine, based on the configuration of the one or more sets of resources, the index using a list of indices for the identified CC.

The communication activity component 830 may receive an indication that the first set of resources is activated. In some examples, the communication activity component 830 may receive an indication that the first set of resources is deactivated.

The scheduling information reception component 835 may receive scheduling information for the first set of resources based on the first set of resources being activated, the scheduling information including a time resource allocation, a frequency resource allocation, a multiplexing scheme, or any combination thereof. In some examples, the scheduling information reception component 835 may determine a number of bits associated with the scheduling information, the number of bits based on one or more CCs associated with the first set of resources, where receiving the scheduling information is based on determining the number of bits. In some examples, receiving the scheduling information via the downlink control message, where a first field of the downlink control message includes an indication of the first set of resources and a second field of the downlink control message includes the scheduling information.

In some examples, the scheduling information reception component 835 may receive, prior to receiving the downlink control message, a configuration message to semi-statically configure a length of the downlink control message, where receiving the downlink control message is based on the length of the downlink control message. In some examples, the scheduling information reception component 835 may determine a length of the downlink control message based on the one or more sets of resources, where receiving the downlink control message is based on the length of the downlink control message. In some examples, the scheduling information reception component 835 may receive the scheduling information via a second downlink control message. In some examples, the scheduling information reception component 835 may determine a length of the second downlink control message based on the first set of resources indicated by the downlink control message, where receiving the second downlink control message is based on the length of the second downlink control message.

Figure 9:
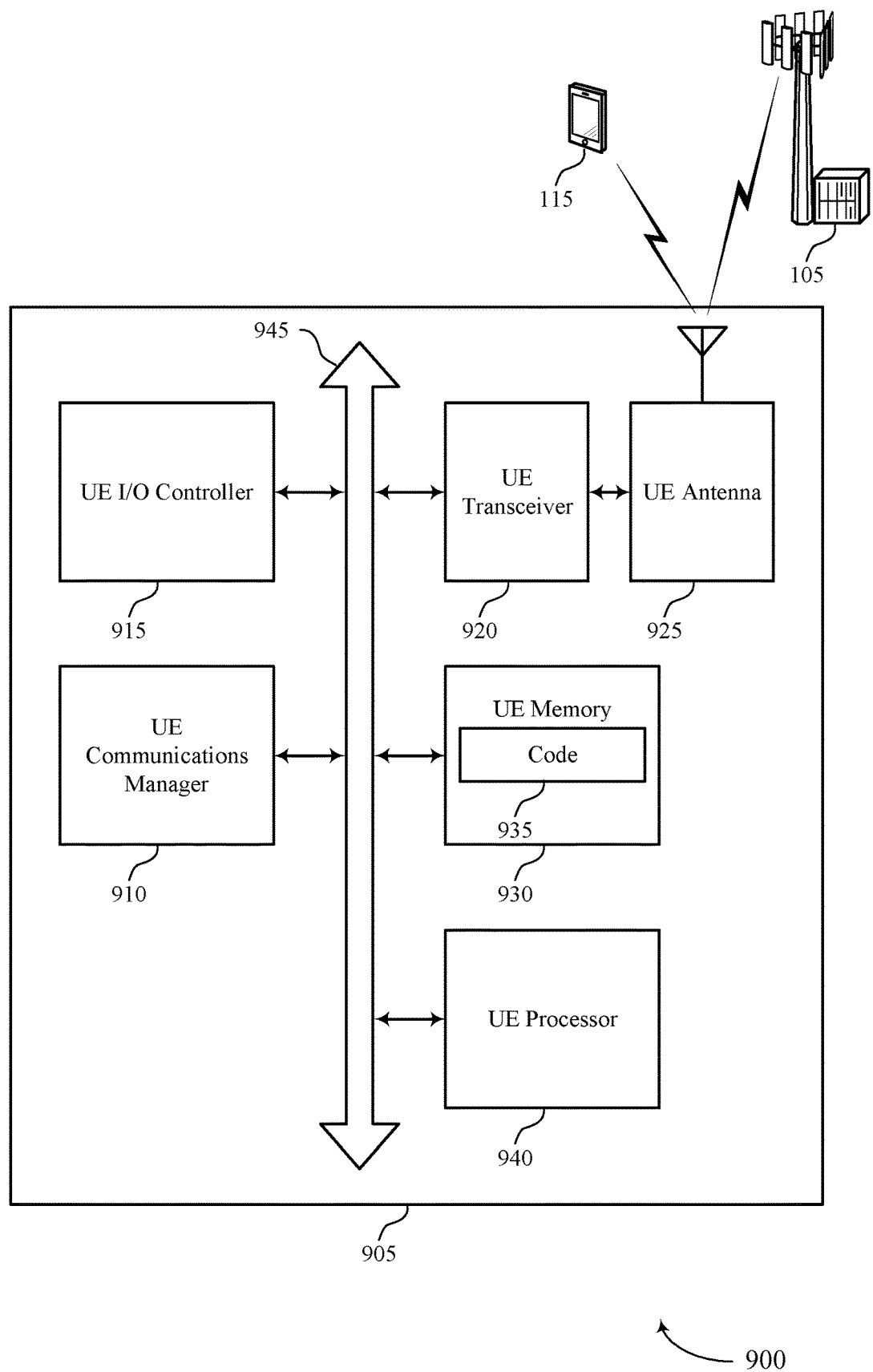
FIG. 9 shows a diagram of a system including a device that supports techniques for activation and deactivation of resources configured across multiple CCs in accordance with various aspects of the present disclosure.

FIG. 9 shows a diagram of a system 900 including a device 905 that supports techniques for activation and deactivation of resources configured across multiple CCs in accordance with various aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, a UE I/O controller 915, a UE transceiver 920, a UE antenna 925, UE memory 930, and a UE processor 940. These components may be in electronic communication via one or more UE buses (e.g., UE bus 945).

The UE communications manager 910 may receive, from a base station, a configuration of one or more sets of resources for multiple CCs for communications with the base station, receive a downlink control message indicating a status of communication activity on a first set of resources of the one or more sets of resources, and communicate with the base station based on the status of communication activity on the first set of resources.

The UE I/O controller 915 may manage input and output signals for the device 905. The UE I/O controller 915 may also manage peripherals not integrated into the device 905. In some cases, the UE I/O controller 915 may represent a physical connection or port to an external peripheral. In some cases, the UE I/O controller 915 may utilize an operating system such as iOS®, ANDROID®, MS-DOS®, MS-WINDOWS®, OS/2®, UNIX®, LINUX®, or another known operating system. In other cases, the UE I/O controller 915 may represent or interact with a modem, a keyboard, a mouse, a touchscreen, or a similar device. In some cases, the UE I/O controller 915 may be implemented as part of a UE processor. In some cases, a user may interact with the device 905 via the UE I/O controller 915 or via hardware components controlled by the UE I/O controller 915.

The UE transceiver 920 may communicate bi-directionally, via one or more UE antennas, wired, or wireless links as described above. For example, the UE transceiver 920 may represent a wireless UE transceiver and may communicate bi-directionally with another wireless UE transceiver. The UE transceiver 920 may also include a modem to modulate the packets and provide the modulated packets to the UE antennas for transmission, and to demodulate packets received from the UE antennas.

In some cases, the wireless device may include a single UE antenna 925. However, in some cases the device may have more than one UE antenna 925, which may be capable of concurrently transmitting or receiving multiple wireless transmissions.

The UE memory 930 may include random access memory (RAM) and read only memory (ROM). The UE memory 930 may store computer-readable, computer-executable code 935 including instructions that, when executed, cause the UE processor to perform various functions described herein. In some cases, the UE memory 930 may contain, among other things, a basic I/O system (BIOS) which may control basic hardware or software operation such as the interaction with peripheral components or devices.

The UE processor 940 may include an intelligent hardware device, (e.g., a general-purpose UE processor, a DSP, a CPU, a microcontroller, an ASIC, an FPGA, a programmable logic device, a discrete gate or transistor logic component, a discrete hardware component, or any combination thereof). In some cases, the UE processor 940 may be configured to operate a UE memory array using a UE memory controller. In other cases, a UE memory controller may be integrated into the UE processor 940. The UE processor 940 may be configured to execute computer-readable instructions stored in a UE memory (e.g., the UE memory 930) to cause the device 905 to perform various functions (e.g., functions or tasks supporting techniques for activation and deactivation of resources configured across multiple CCs).

The computer-executable code 935 may include instructions to implement aspects of the present disclosure, including instructions to support wireless communications. The computer-executable code 935 may be stored in a non-transitory computer-readable medium such as system UE memory or other type of UE memory. In some cases, the computer-executable code 935 may not be directly executable by the UE processor 940 but may cause a computer (e.g., when compiled and executed) to perform functions described herein.

Figure 10:
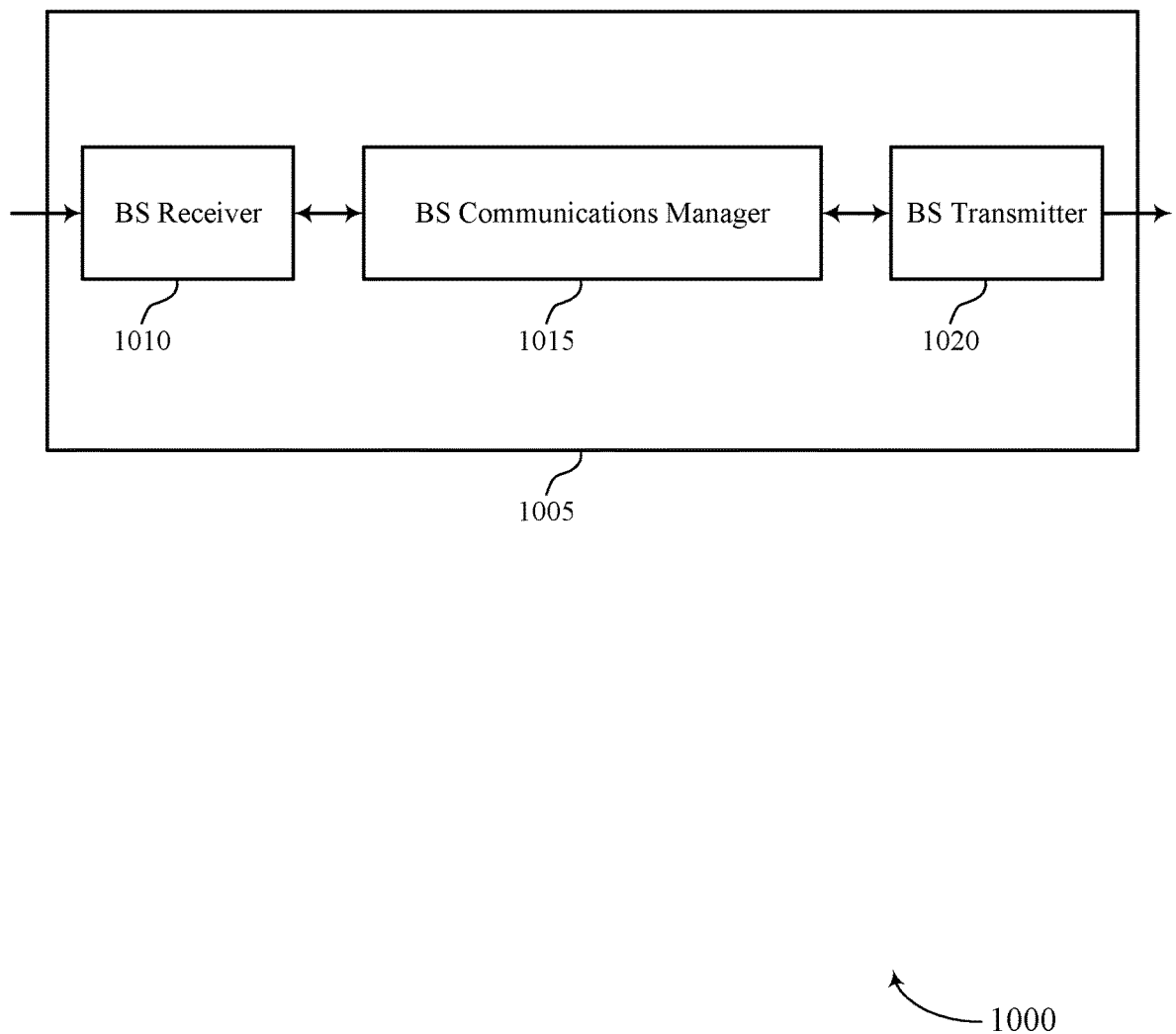
FIG. 10 shows a block diagram of a device that supports techniques for activation and deactivation of resources configured across multiple CCs in accordance with various aspects of the present disclosure.

FIG. 10 shows a block diagram 1000 of a device 1005 that supports techniques for activation and deactivation of resources configured across multiple CCs in accordance with various aspects of the present disclosure. The device 1005 may be an example of aspects of a base station 105 as described herein. The device 1005 may include a base station receiver 1010, a base station communications manager 1015, and a base station transmitter 1020. The device 1005 may also include a base station processor. Each of these components may be in communication with one another (e.g., via one or more base station buses).

The base station receiver 1010 may receive information such as packets, user data, or control information associated with various information channels (e.g., control channels, data channels, and information related to techniques for activation and deactivation of resources configured across multiple CCs, etc.). Information may be passed on to other components of the device 1005. The base station receiver 1010 may be an example of aspects of the base station transceiver 1320 described with reference to FIG. 13. The base station receiver 1010 may utilize a single base station antenna or a set of base station antennas.

The base station communications manager 1015 may transmit, to a UE, an indication of a configuration of one or more sets of resources for a set of CCs for communications with the UE, transmit a downlink control message indicating a first set of resources of the one or more sets of resources based on a status of communication activity for the first set of resources, and communicate with the UE based on the downlink control message and the status of communication activity for the first set of resources. The base station communications manager 1015 may be an example of aspects of the base station communications manager 1310 described herein.

The base station communications manager 1015, or its sub-components, may be implemented in hardware, code (e.g., software or firmware) executed by a base station processor, or any combination thereof. If implemented in code executed by a base station processor, the functions of the base station communications manager 1015, or its sub-components may be executed by a general-purpose base station processor, a DSP, an ASIC, an FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an I/O component, a base station transceiver, a network server, another computing device, one or more other components described in the present disclosure, or a combination thereof in accordance with various aspects of the present disclosure.

The base station transmitter 1020 may transmit signals generated by other components of the device 1005. In some examples, the base station transmitter 1020 may be collocated with a base station receiver 1010 in a base station transceiver component. For example, the base station transmitter 1020 may be an example of aspects of the base station transceiver 1320 described with reference to FIG. 13. The base station transmitter 1020 may utilize a single base station antenna or a set of base station antennas.

Figure 11:
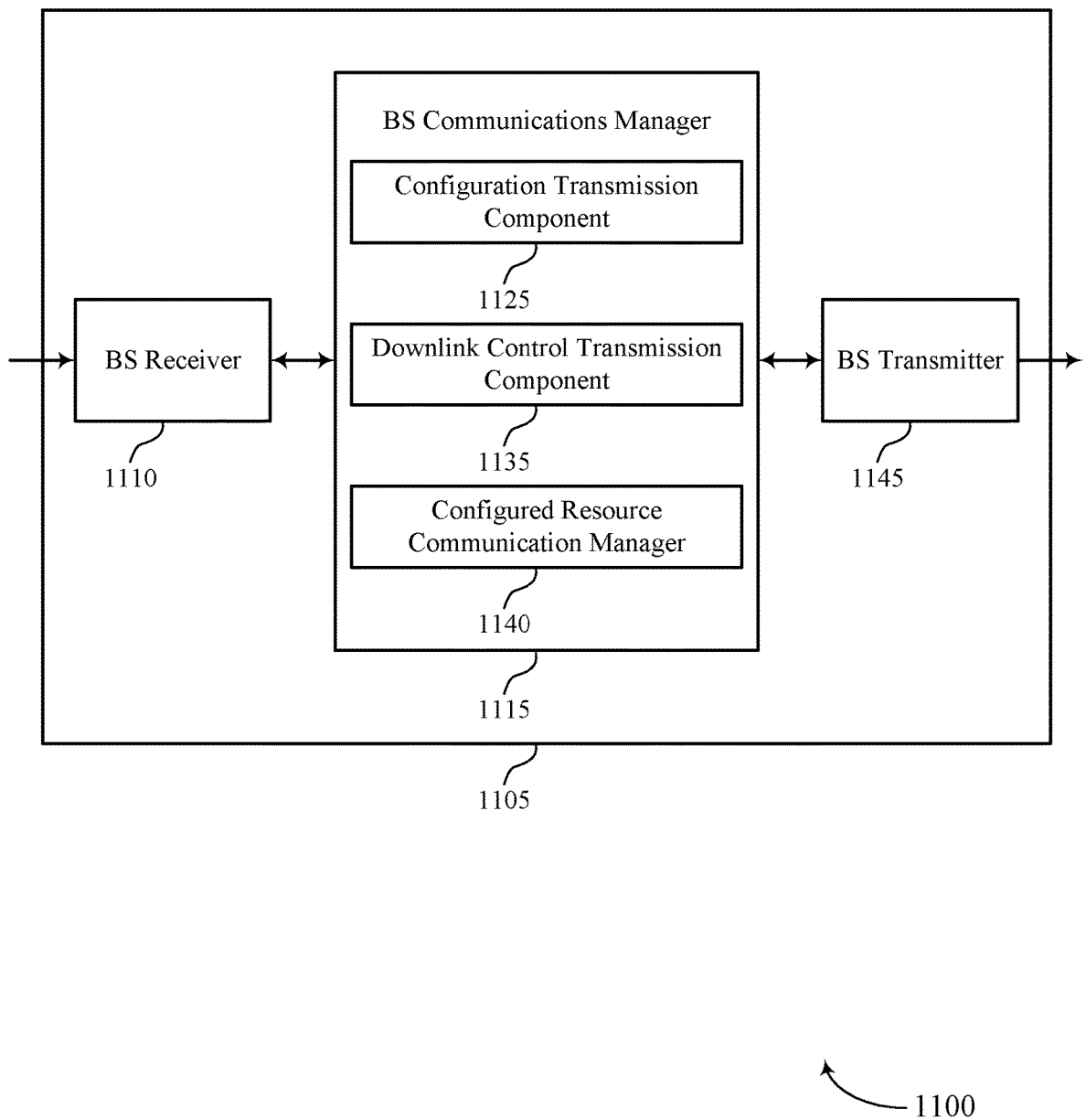
FIG. 11 shows a block diagram of a device that supports techniques for activation and deactivation of resources configured across multiple CCs in accordance with various aspects of the present disclosure.

FIG. 11 shows a block diagram 1100 of a device 1105 that supports techniques for activation and deactivation of resources configured across multiple CCs in accordance with various aspects of the present disclosure. The device 1105 may be an example of aspects of a device 1005, or a base station 105 as described herein. The device 1105 may include a base station receiver 1110, a base station communications manager 1115, and a base station transmitter 1145. The device 1105 may also include a base station processor. Each of these components may be in communication with one another (e.g., via one or more base station buses).

The base station receiver 1110 may receive information such as packets, user data, or control information associated with various information channels (e.g., control channels, data channels, and information related to techniques for activation and deactivation of resources configured across multiple CCs, etc.). Information may be passed on to other components of the device 1105. The base station receiver 1110 may be an example of aspects of the base station transceiver 1320 described with reference to FIG. 13. The base station receiver 1110 may utilize a single base station antenna or a set of base station antennas.

The base station communications manager 1115 may be an example of aspects of the base station communications manager 1015 as described herein. The base station communications manager 1115 may include a configuration transmission component 1125, a downlink control transmission component 1135, and a configured resource communication manager 1140. The base station communications manager 1115 may be an example of aspects of the base station communications manager 1310 described herein.

The configuration transmission component 1125 may transmit, to a UE, an indication of a configuration of one or more sets of resources for a set of CCs for communications with the UE. The downlink control transmission component 1135 may transmit a downlink control message indicating a first set of resources of the one or more sets of resources based on a status of communication activity for the first set of resources. The configured resource communication manager 1140 may communicate with the UE based on the downlink control message and the status of communication activity for the first set of resources.

The base station transmitter 1145 may transmit signals generated by other components of the device 1105. In some examples, the base station transmitter 1145 may be collocated with a base station receiver 1110 in a base station transceiver component. For example, the base station transmitter 1145 may be an example of aspects of the base station transceiver 1320 described with reference to FIG. 13. The base station transmitter 1145 may utilize a single base station antenna or a set of base station antennas.

Figure 12:
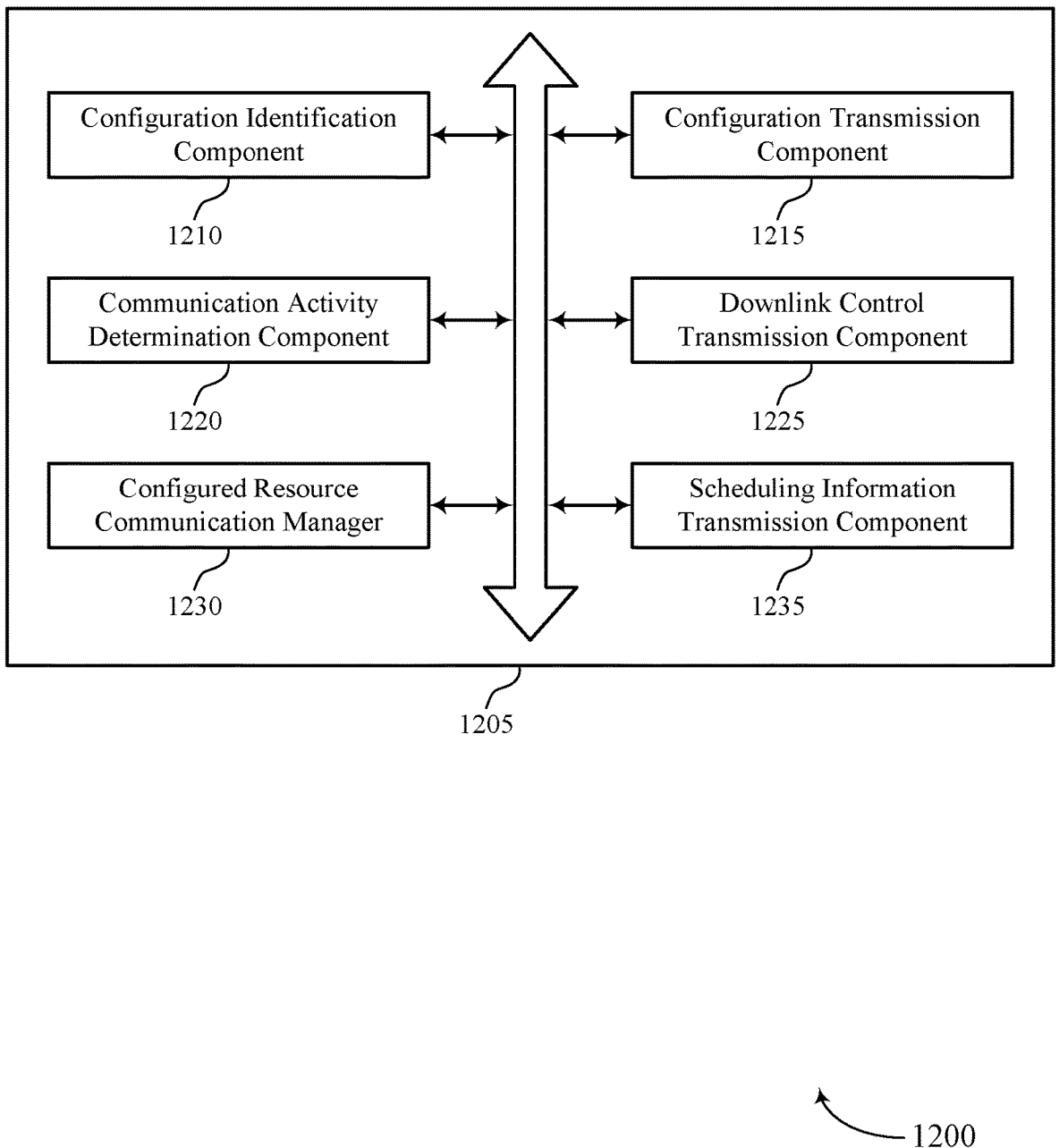
FIG. 12 shows a block diagram of a base station communications manager that supports techniques for activation and deactivation of resources configured across multiple CCs in accordance with various aspects of the present disclosure.

FIG. 12 shows a block diagram 1200 of a base station communications manager 1205 that supports techniques for activation and deactivation of resources configured across multiple CCs in accordance with various aspects of the present disclosure. The base station communications manager 1205 may be an example of aspects of a base station communications manager 1015, a base station communications manager 1115, or a base station communications manager 1310 described herein. The base station communications manager 1205 may include a configuration identification component 1210, a configuration transmission component 1215, a communication activity determination component 1220, a downlink control transmission component 1225, a configured resource communication manager 1230, and a scheduling information transmission component 1235. Each of these components may communicate, directly or indirectly, with one another (e.g., via one or more base station buses).

The configuration identification component 1210 may identify a configuration of one or more sets of resources for multiple CCs for communications with a UE.

The configuration transmission component 1215 may transmit, to the UE, an indication of the configuration of the one or more sets of resources. In some examples, the configuration transmission component 1215 may transmit an indication of the one or more sets of resources for a group of CCs of the multiple CCs, where each value of a field of the downlink control message is associated with a set of the one or more sets of resources. In some examples, the configuration transmission component 1215 may transmit a list of resources for each CC of the multiple CCs, where each combination of a CC of the set and a value of a field of the downlink control message is associated with a set of the one or more sets of resources.

In some examples, the configuration transmission component 1215 may indicate the first set of resources using a value of a field of the downlink control message. In some examples, the configuration transmission component 1215 may indicate a first index of a resource of the first set of resources based on the configuration of the one or more sets of resources and the value of the field, where each resource of the first set of resources is associated with a respective first index indicating a CC of the multiple CCs that is associated with the respective resource. In some examples, the configuration transmission component 1215 may indicate a second index of the resource based on the configuration of the one or more sets of resources and the value of the field, where each resource of the first set of resources is associated with a respective second index indicating a respective resource within the associated CC, the second index unique to the associated CC.

In some examples, the configuration transmission component 1215 may identify a CC of the set on used to transmit the downlink control message. In some examples, the configuration transmission component 1215 may indicate, based on the configuration of the one or more sets of resources, the first index and the second index using a list of indices for the identified CC.

In some examples, the configuration transmission component 1215 may indicate an index of a resource of the first set of resources based on the configuration of the one or more sets of resources and the value of the field, where each resource of the first set of resources is associated with a respective index indicating a respective resource, the index global to the multiple CCs. In some examples, the configuration transmission component 1215 may identify a CC of the set on used to receive the downlink control message. In some examples, the configuration transmission component 1215 may indicate, based on the configuration of the one or more sets of resources, the index using a list of indices for the identified CC. In some examples, the configuration transmission component 1215 may transmit an RRC message indicating the one or more sets of resources.

The communication activity determination component 1220 may determine a status of communication activity for a first set of resources of the one or more sets of resources. In some examples, the communication activity determination component 1220 may determine to activate the first set of resources. In some examples, the communication activity determination component 1220 may determine to deactivate the first set of resources.

The downlink control transmission component 1225 may transmit a downlink control message indicating the first set of resources based on the status of communication activity for the first set of resources.

The configured resource communication manager 1230 may communicate with the UE based on the downlink control message and the status of communication activity for the first set of resources. In some cases, the first set of resources includes downlink SPS resources. In some cases, the first set of resources includes uplink configured grant resources.

The scheduling information transmission component 1235 may transmit scheduling information for the first set of resources based on the first set of resources being activated, the scheduling information including a time resource allocation, a frequency resource allocation, a multiplexing scheme, or any combination thereof. In some examples, the scheduling information transmission component 1235 may determine a number of bits associated with the scheduling information, the number of bits based on one or more CCs associated with the first set of resources, where transmitting the scheduling information is based on determining the number of bits.

In some examples, the scheduling information may be transmitted via the downlink control message, where a first field of the downlink control message includes an indication of the first set of resources and a second field of the downlink control message includes the scheduling information.

In some examples, the scheduling information transmission component 1235 may transmit, prior to transmitting the downlink control message, a configuration message to semi-statically configure a length of the downlink control message, where transmitting the downlink control message is based on the length of the downlink control message. In some examples, the scheduling information transmission component 1235 may determine a length of the downlink control message based on the one or more sets of resources, where transmitting the downlink control message is based on the length of the downlink control message.

In some examples, the scheduling information transmission component 1235 may transmit the scheduling information via a second downlink control message. In some examples, the scheduling information transmission component 1235 may determine a length of the second downlink control message based on the first set of resources indicated by the downlink control message, where transmitting the second downlink control message is based on the length of the second downlink control message.

Figure 13:
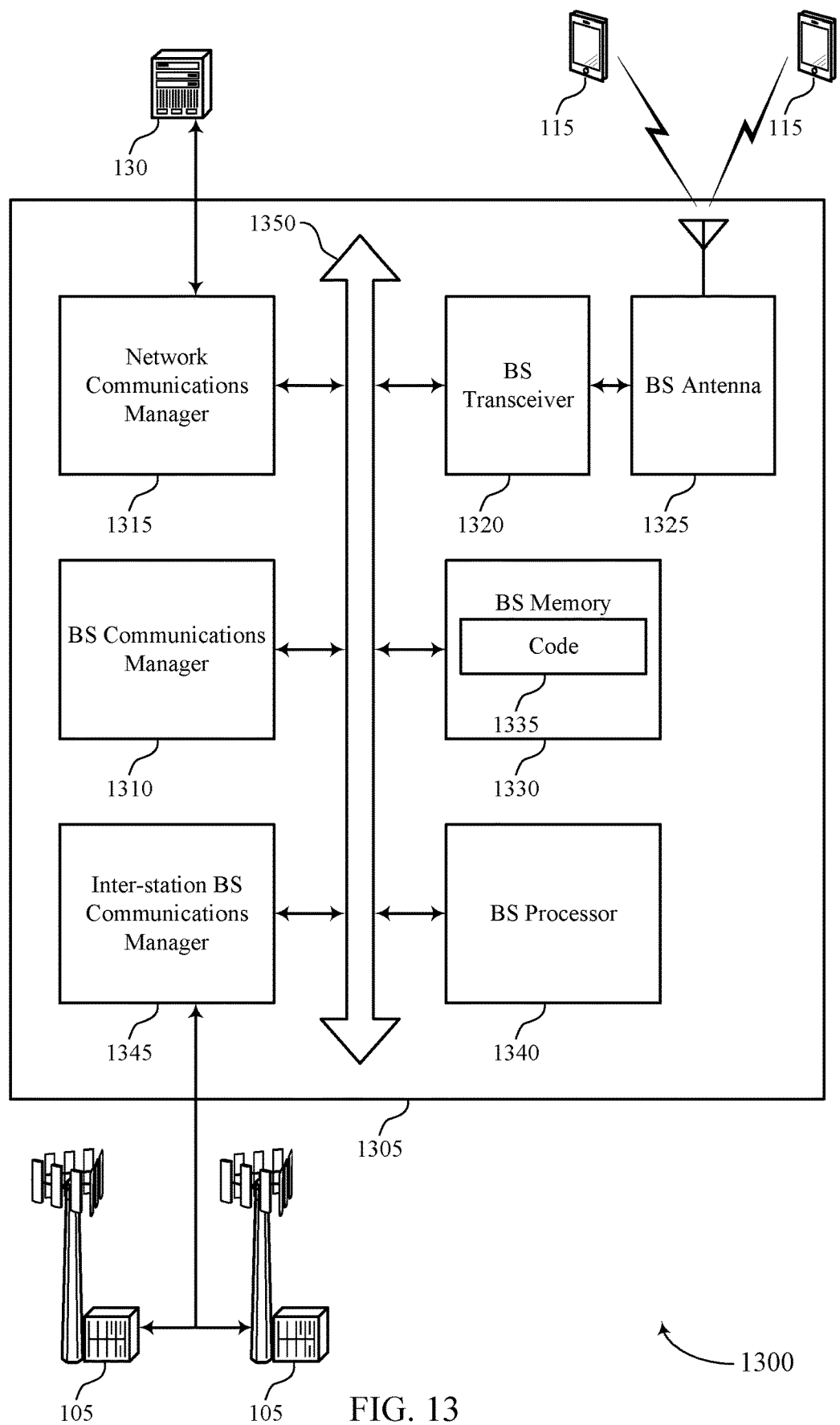
FIG. 13 shows a block diagram of a system including a device that supports techniques for activation and deactivation of resources configured across multiple CCs in accordance with various aspects of the present disclosure.

FIG. 13 shows a diagram of a system 1300 including a device 1305 that supports techniques for activation and deactivation of resources configured across multiple CCs in accordance with various aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network base station communications manager 1315, a base station transceiver 1320, an base station antenna 1325, base station memory 1330, a base station processor 1340, and an inter-station base station communications manager 1345. These components may be in electronic communication via one or more base station buses (e.g., base station bus 1350).

The base station communications manager 1310 may transmit, to a UE, an indication of a configuration of one or more sets of resources for a set of CCs for communications with the UE, transmit a downlink control message indicating a first set of resources of the one or more sets of resources based on a status of communication activity for the first set of resources, and communicate with the UE based on the downlink control message and the status of communication activity for the first set of resources.

The network base station communications manager 1315 may manage communications with the core network (e.g., via one or more wired backhaul links). For example, the network base station communications manager 1315 may manage the transfer of data communications for client devices, such as one or more UEs 115.

The base station transceiver 1320 may communicate bi-directionally, via one or more base station antennas, wired, or wireless links as described above. For example, the base station transceiver 1320 may represent a wireless base station transceiver and may communicate bi-directionally with another wireless base station transceiver. The base station transceiver 1320 may also include a modem to modulate the packets and provide the modulated packets to the base station antennas for transmission, and to demodulate packets received from the base station antennas.

In some cases, the wireless device may include a single base station antenna 1325. However, in some cases the device may have more than one base station antenna 1325, which may be capable of concurrently transmitting or receiving multiple wireless transmissions.

The base station memory 1330 may include RAM, ROM, or a combination thereof. The base station memory 1330 may store computer-readable code 1335 including instructions that, when executed by a base station processor (e.g., the base station processor 1340) cause the device to perform various functions described herein. In some cases, the base station memory 1330 may contain, among other things, a BIOS which may control basic hardware or software operation such as the interaction with peripheral components or devices.

The base station processor 1340 may include an intelligent hardware device, (e.g., a general-purpose base station processor, a DSP, a CPU, a microcontroller, an ASIC, an FPGA, a programmable logic device, a discrete gate or transistor logic component, a discrete hardware component, or any combination thereof). In some cases, the base station processor 1340 may be configured to operate a base station memory array using a base station memory controller. In some cases, a base station memory controller may be integrated into base station processor 1340. The base station processor 1340 may be configured to execute computer-readable instructions stored in a base station memory (e.g., the base station memory 1330) to cause the device 1305 to perform various functions (e.g., functions or tasks supporting techniques for activation and deactivation of resources configured across multiple CCs).

The inter-station base station communications manager 1345 may manage communications with other base station 105, and may include a controller or scheduler for controlling communications with UEs 115 in cooperation with other base stations 105. For example, the inter-station base station communications manager 1345 may coordinate scheduling for transmissions to UEs 115 for various interference mitigation techniques such as beamforming or joint transmission. In some examples, the inter-station base station communications manager 1345 may provide an X2 interface within an LTE/LTE-A wireless communication network technology to provide communication between base stations 105.

The computer-readable code 1335 may include instructions to implement aspects of the present disclosure, including instructions to support wireless communications. The computer-readable code 1335 may be stored in a non-transitory computer-readable medium such as system base station memory or other type of base station memory. In some cases, the computer readable code 1335 may not be directly executable by the base station processor 1340 but may cause a computer (e.g., when compiled and executed) to perform functions described herein.

Figure 14:
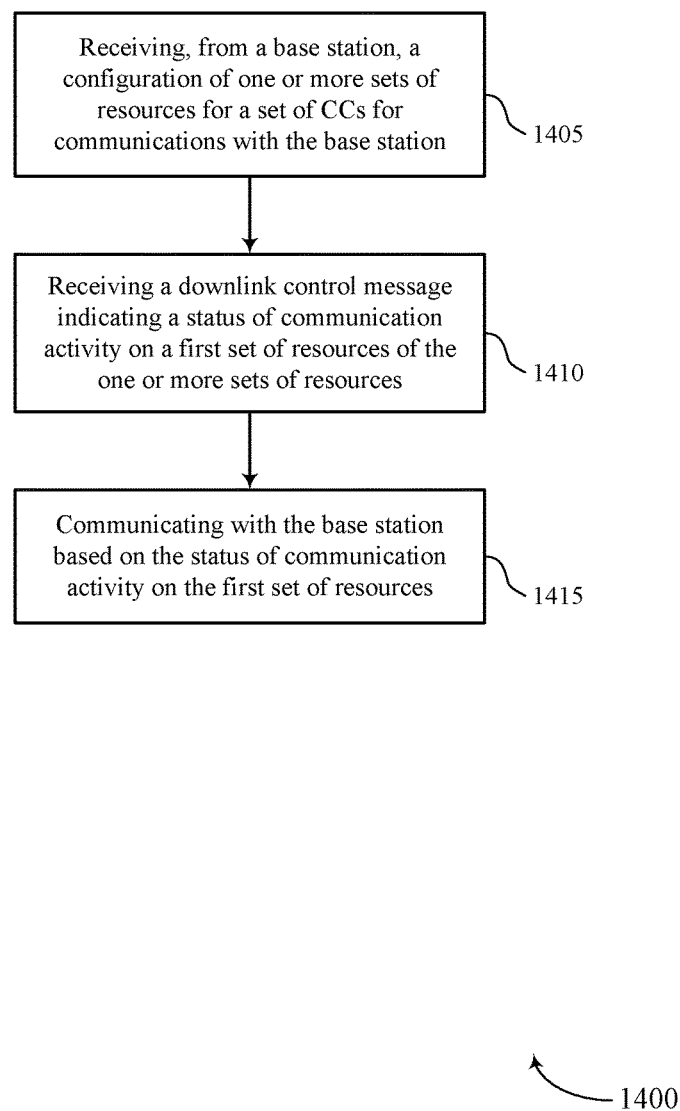
FIG. 14 shows a flowchart illustrating a technique that supports techniques for activation and deactivation of resources configured across multiple CCs in accordance with various aspects of the present disclosure.

FIG. 14 shows a flowchart illustrating a technique 1400 that supports techniques for activation and deactivation of resources configured across multiple CCs in accordance with various aspects of the present disclosure. The operations of technique 1400 may be implemented by a UE 115 or its components as described herein. For example, the operations of technique 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configuration of one or more sets of resources for multiple CCs for communications with the base station. The operations of 1405 may be performed according to the techniques described herein. In some examples, aspects of the operations of 1405 may be performed by a configuration reception component as described with reference to FIGS. 6 through 9.

At 1410, the UE may receive a downlink control message indicating a status of communication activity on a first set of resources of the one or more sets of resources. The operations of 1410 may be performed according to the techniques described herein. In some examples, aspects of the operations of 1410 may be performed by a downlink control reception component as described with reference to FIGS. 6 through 9.

At 1415, the UE may communicate with the base station based on the status of communication activity on the first set of resources. The operations of 1415 may be performed according to the techniques described herein. In some examples, aspects of the operations of 1415 may be performed by a configured resource communication component as described with reference to FIGS. 6 through 9.

Figure 15:
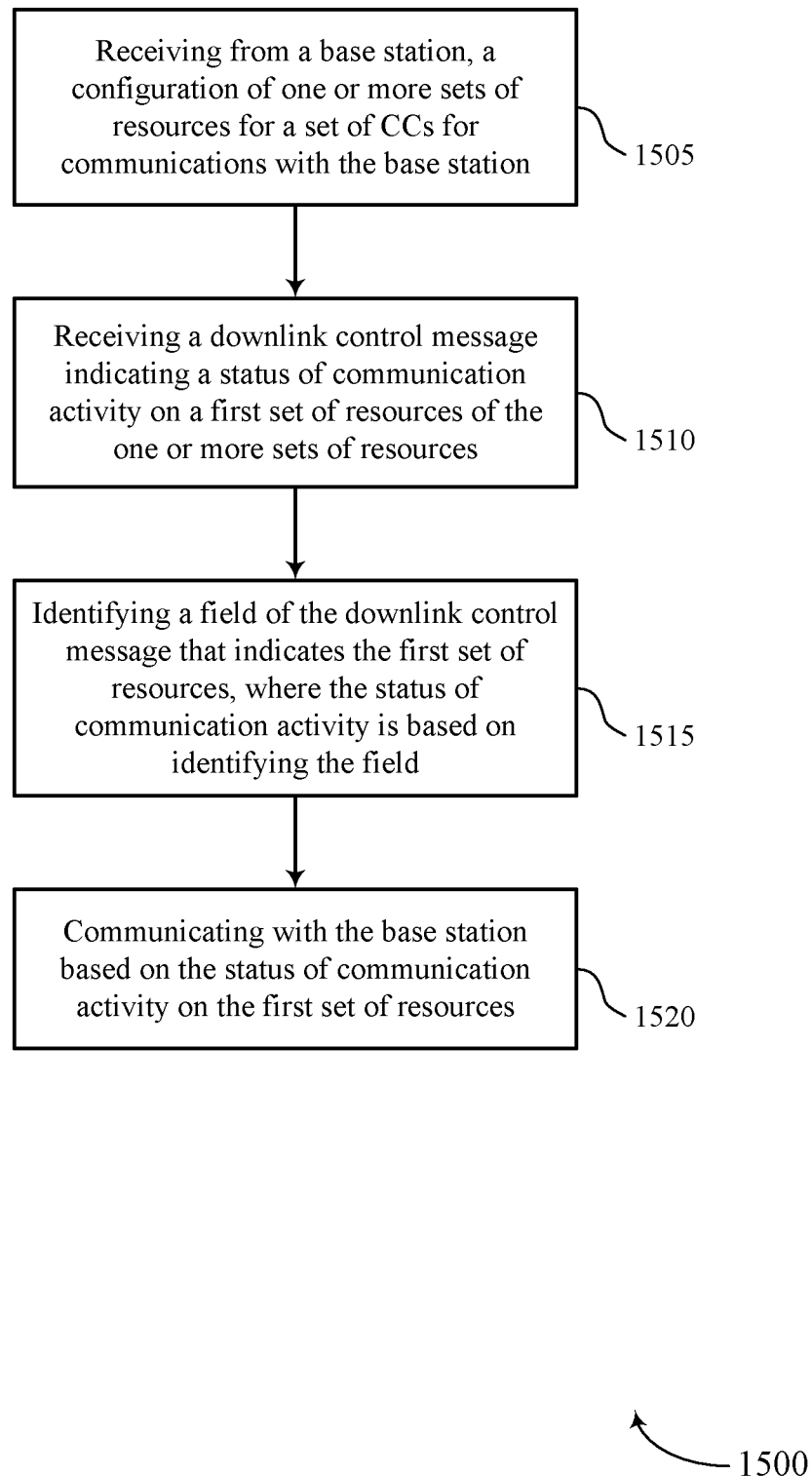
FIG. 15 shows a flowchart illustrating a technique that supports techniques for activation and deactivation of resources configured across multiple CCs in accordance with various aspects of the present disclosure.

FIG. 15 shows a flowchart illustrating a technique 1500 that supports techniques for activation and deactivation of resources configured across multiple CCs in accordance with various aspects of the present disclosure. The operations of technique 1500 may be implemented by a UE 115 or its components as described herein. For example, the operations of technique 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a configuration of one or more sets of resources for multiple CCs for communications with the base station. The operations of 1505 may be performed according to the techniques described herein. In some examples, aspects of the operations of 1505 may be performed by a configuration reception component as described with reference to FIGS. 6 through 9.

At 1510, the UE may receive a downlink control message indicating a status of communication activity on a first set of resources of the one or more sets of resources. The operations of 1510 may be performed according to the techniques described herein. In some examples, aspects of the operations of 1510 may be performed by a downlink control reception component as described with reference to FIGS. 6 through 9.

At 1515, the UE may identify a field of the downlink control message that indicates the first set of resources, where the status of communication activity is based on identifying the field. The operations of 1515 may be performed according to the techniques described herein. In some examples, aspects of the operations of 1515 may be performed by a resource identification component as described with reference to FIGS. 6 through 9.

At 1520, the UE may communicate with the base station based on the status of communication activity on the first set of resources. The operations of 1520 may be performed according to the techniques described herein. In some examples, aspects of the operations of 1520 may be performed by a configured resource communication component as described with reference to FIGS. 6 through 9.

Figure 16:
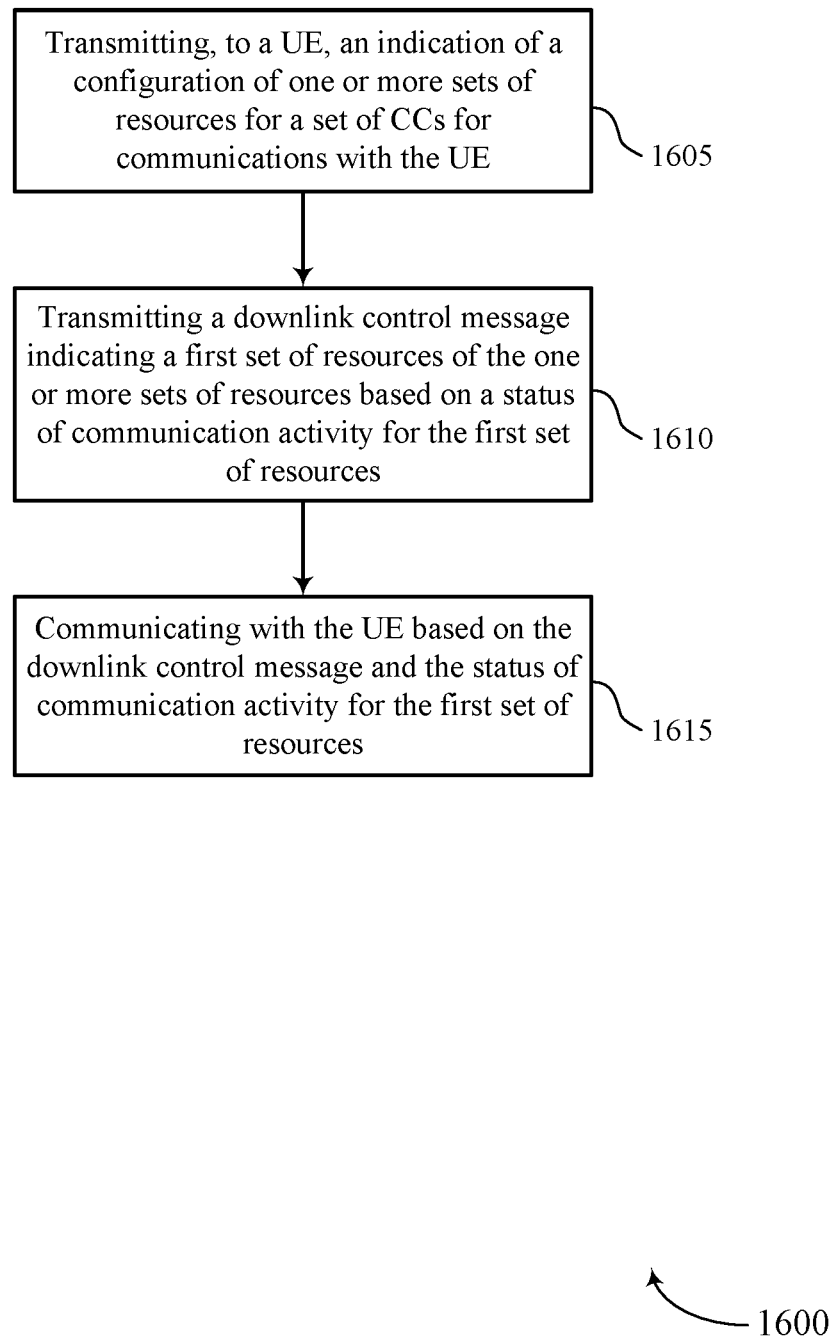
FIG. 16 shows a flowchart illustrating a technique that supports techniques for activation and deactivation of resources configured across multiple CCs in accordance with various aspects of the present disclosure.

FIG. 16 shows a flowchart illustrating a technique 1600 that supports techniques for activation and deactivation of resources configured across multiple CCs in accordance with various aspects of the present disclosure. The operations of technique 1600 may be implemented by a base station 105 or its components as described herein. For example, the operations of technique 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, an indication of a configuration of the one or more sets of resources for a set of CCs for communications with the UE. The operations of 1605 may be performed according to the techniques described herein. In some examples, aspects of the operations of 1605 may be performed by a configuration transmission component as described with reference to FIGS. 10 through 13.

At 1610, the base station may transmit a downlink control message indicating a first set of resources of the one or more sets of resources based on a status of communication activity for the first set of resources. The operations of 1610 may be performed according to the techniques described herein. In some examples, aspects of the operations of 1610 may be performed by a downlink control transmission component as described with reference to FIGS. 10 through 13.

At 1615, the base station may communicate with the UE based on the downlink control message and the status of communication activity for the first set of resources. The operations of 1615 may be performed according to the techniques described herein. In some examples, aspects of the operations of 1615 may be performed by a configured resource communication manager as described with reference to FIGS. 10 through 13.

Figure 17:
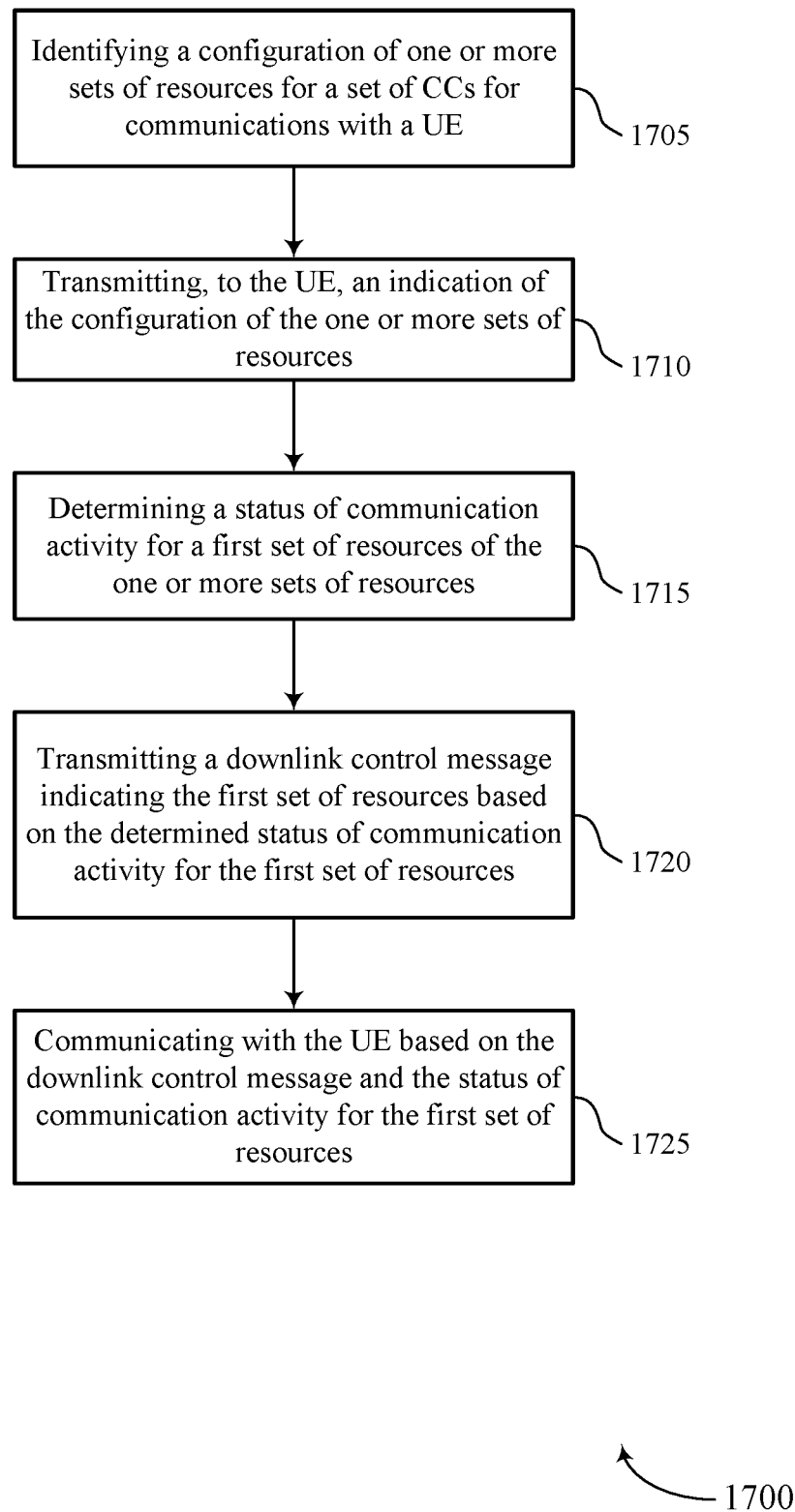
FIG. 17 shows a flowchart illustrating a technique that supports techniques for activation and deactivation of resources configured across multiple CCs in accordance with various aspects of the present disclosure.

FIG. 17 shows a flowchart illustrating a technique 1700 that supports techniques for activation and deactivation of resources configured across multiple CCs in accordance with various aspects of the present disclosure. The operations of technique 1700 may be implemented by a base station 105 or its components as described herein. For example, the operations of technique 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may identify a configuration of one or more sets of resources for multiple CCs for communications with a UE. The operations of 1705 may be performed according to the techniques described herein. In some examples, aspects of the operations of 1705 may be performed by a configuration identification component as described with reference to FIGS. 10 through 13.

At 1710, the base station may transmit, to the UE, an indication of the configuration of the one or more sets of resources. The operations of 1710 may be performed according to the techniques described herein. In some examples, aspects of the operations of 1710 may be performed by a configuration transmission component as described with reference to FIGS. 10 through 13.

At 1715, the base station may determine a status of communication activity for a first set of resources of the one or more sets of resources. The operations of 1715 may be performed according to the techniques described herein. In some examples, aspects of the operations of 1715 may be performed by a communication activity determination component as described with reference to FIGS. 10 through 13.

At 1720, the base station may transmit a downlink control message indicating the first set of resources based on the status of communication activity for the first set of resources. The operations of 1720 may be performed according to the techniques described herein. In some examples, aspects of the operations of 1720 may be performed by a downlink control transmission component as described with reference to FIGS. 10 through 13.

At 1725, the base station may communicate with the UE based on the downlink control message and the status of communication activity for the first set of resources. The operations of 1725 may be performed according to the techniques described herein. In some examples, aspects of the operations of 1725 may be performed by a configured resource communication manager as described with reference to FIGS. 10 through 13.

The following provides an overview of aspects of the present disclosure:

Aspect 1: A method for wireless communication at a UE, comprising: receiving, from a base station, a configuration of one or more sets of resources for a plurality of CCs for communications with the base station; receiving a downlink control message indicating a status of communication activity on a first set of resources of the one or more sets of resources; and communicating with the base station based at least in part on the status of communication activity on the first set of resources.

Aspect 2: The method of aspect 1, wherein receiving the configuration of the one or more sets of resources further comprises: receiving an indication of the one or more sets of resources for a group of CCs of the plurality of CCs, wherein each value of a field of the downlink control message is associated with a set of the one or more sets of resources.

Aspect 3: The method of aspect 1, wherein receiving the configuration of the one or more sets of resources further comprises: receiving a list of resources for each CC of the plurality of CCs, wherein each combination of a CC of the plurality and a value of a field of the downlink control message is associated with a set of the one or more sets of resources.

Aspect 4: The method of any of aspects 1 through 3, further comprising: identifying a field of the downlink control message that indicates the first set of resources, wherein the status of communication activity is based at least in part on identifying the field.

Aspect 5: The method of aspect 4, further comprising: identifying the first set of resources based at least in part on a value of the field, wherein the status of communication activity is based at least in part on identifying the first set of resources.

Aspect 6: The method of aspect 5, wherein identifying the first set of resources further comprises: determining a first index of a resource of the first set of resources based at least in part on the configuration of the one or more sets of resources and the value of the field, wherein each resource of the first set of resources is associated with a respective first index indicating a CC of the plurality of CCs that is associated with the respective resource; and determining a second index of the resource based at least in part on the configuration of the one or more sets of resources and the value of the field, wherein each resource of the first set of resources is associated with a respective second index indicating a respective resource within the associated CC, the second index unique to the associated CC.

Aspect 7: The method of aspect 6, wherein determining the first index and the second index further comprises: identifying a CC of the plurality used to receive the downlink control message; and determining, based at least in part on the configuration of the one or more sets of resources, the first index and the second index using a list of indices for the identified CC.

Aspect 8: The method of aspect 5, wherein identifying the first set of resources further comprises: determining an index of a resource of the first set of resources based at least in part on the configuration of the one or more sets of resources and the value of the field, wherein each resource of the first set of resources is associated with a respective index indicating a respective resource, the index global to the plurality of CCs.

Aspect 9: The method of aspect 8, wherein determining the index further comprises: identifying a CC of the plurality used to receive the downlink control message; and determining, based at least in part on the configuration of the one or more sets of resources, the index using a list of indices for the identified CC.

Aspect 10: The method of any of aspects 1 through 9, wherein receiving the downlink control message indicating the status of communication activity further comprises: receiving an indication that the first set of resources is activated.

Aspect 11: The method of aspect 10, further comprising: receiving scheduling information for the first set of resources based at least in part on the first set of resources being activated, the scheduling information comprising a time resource allocation, a frequency resource allocation, a multiplexing scheme, or any combination thereof.

Aspect 12: The method of aspect 11, further comprising: determining a number of bits associated with the scheduling information, the number of bits based at least in part on one or more CCs associated with the first set of resources, wherein receiving the scheduling information is based at least in part on determining the number of bits.

Aspect 13: The method of any of aspects 11 through 12, wherein receiving the scheduling information further comprises: receiving the scheduling information via the downlink control message, wherein a first field of the downlink control message comprises an indication of the first set of resources and a second field of the downlink control message comprises the scheduling information.

Aspect 14: The method of aspect 13, further comprising: receiving, prior to receiving the downlink control message, a configuration message to semi-statically configure a length of the downlink control message, wherein receiving the downlink control message is based at least in part on the length of the downlink control message.

Aspect 15: The method of any of aspects 13 through 14, further comprising: determining a length of the downlink control message based at least in part on the one or more sets of resources, wherein receiving the downlink control message is based at least in part on the length of the downlink control message.

Aspect 16: The method of any of aspects 11 through 12, wherein receiving the scheduling information further comprises: receiving the scheduling information via a second downlink control message.

Aspect 17: The method of aspect 16, further comprising: determining a length of the second downlink control message based at least in part on the first set of resources indicated by the downlink control message, wherein receiving the second downlink control message is based at least in part on the length of the second downlink control message.

Aspect 18: The method of any of aspects 1 through 9, wherein receiving the downlink control message indicating the status of communication activity further comprises: receiving an indication that the first set of resources is deactivated.

Aspect 19: The method of any of aspects 1 through 18, wherein receiving the configuration of the one or more sets of resources comprises: receiving an RRC message indicating the one or more sets of resources.

Aspect 20: The method of any of aspects 1 through 19, wherein the first set of resources comprises downlink SPS resources.

Aspect 21: The method of any of aspects 1 through 20, wherein the first set of resources comprises uplink configured grant resources.

Aspect 22: A method for wireless communication at a base station, comprising: transmitting, to a UE, an indication of a configuration of one or more sets of resources for a plurality of CCs for communications with the UE; transmitting a downlink control message indicating a first set of resources of the one or more sets of resources based at least in part on a status of communication activity for the first set of resources; and communicating with the UE based at least in part on the downlink control message and the status of communication activity for the first set of resources.

Aspect 23: The method of aspect 22, wherein transmitting the indication of the configuration of the one or more sets of resources further comprises: transmitting an indication of the one or more sets of resources for a group of CCs of the plurality of CCs, wherein each value of a field of the downlink control message is associated with a set of the one or more sets of resources.

Aspect 24: The method of aspect 22, wherein transmitting the indication of the configuration of the one or more sets of resources further comprises: transmitting a list of resources for each CC of the plurality of CCs, wherein each combination of a CC of the plurality and a value of a field of the downlink control message is associated with a set of the one or more sets of resources.

Aspect 25: The method of any of aspects 22 through 24, wherein transmitting the downlink control message indicating the first set of resources further comprises: indicating the first set of resources using a value of a field of the downlink control message.

Aspect 26: The method of aspect 25, wherein indicating the first set of resources further comprises: indicating a first index of a resource of the first set of resources based at least in part on the configuration of the one or more sets of resources and the value of the field, wherein each resource of the first set of resources is associated with a respective first index indicating a CC of the plurality of CCs that is associated with the respective resource; and indicating a second index of the resource based at least in part on the configuration of the one or more sets of resources and the value of the field, wherein each resource of the first set of resources is associated with a respective second index indicating a respective resource within the associated CC, the second index unique to the associated CC.

Aspect 27: The method of aspect 26, wherein indicating the first index and the second index further comprises: identifying a CC of the plurality on used to transmit the downlink control message; and indicating, based at least in part on the configuration of the one or more sets of resources, the first index and the second index using a list of indices for the identified CC.

Aspect 28: The method of aspect 25, wherein indicating the first set of resources further comprises: indicating an index of a resource of the first set of resources based at least in part on the configuration of the one or more sets of resources and the value of the field, wherein each resource of the first set of resources is associated with a respective index indicating a respective resource, the index global to the plurality of CCs.

Aspect 29: The method of aspect 28, wherein indicating the index further comprises: identifying a CC of the plurality used to receive the downlink control message; and indicating, based at least in part on the configuration of the one or more sets of resources, the index using a list of indices for the identified CC.

Aspect 30: The method of any of aspects 22 through 29, wherein the status of communication activity for the first set of resources is indicative that the first set of resources is activated, the method further comprising: transmitting scheduling information for the first set of resources based at least in part on the first set of resources being activated, the scheduling information comprising a time resource allocation, a frequency resource allocation, a multiplexing scheme, or any combination thereof.

Aspect 31: The method of aspect 30, further comprising: determining a number of bits associated with the scheduling information, the number of bits based at least in part on one or more CCs associated with the first set of resources, wherein transmitting the scheduling information is based at least in part on determining the number of bits.

Aspect 32: The method of any of aspects 30 through 31, wherein transmitting the scheduling information further comprises: transmitting the scheduling information via the downlink control message, wherein a first field of the downlink control message comprises an indication of the first set of resources and a second field of the downlink control message comprises the scheduling information.

Aspect 33: The method of aspect 32, further comprising: transmitting, prior to transmitting the downlink control message, a configuration message to semi-statically configure a length of the downlink control message, wherein transmitting the downlink control message is based at least in part on the length of the downlink control message.

Aspect 34: The method of any of aspects 32 through 33, further comprising: determining a length of the downlink control message based at least in part on the one or more sets of resources, wherein transmitting the downlink control message is based at least in part on the length of the downlink control message.

Aspect 35: The method of any of aspects 30 through 31, wherein transmitting the scheduling information further comprises: transmitting the scheduling information via a second downlink control message.

Aspect 36: The method of aspect 35, further comprising: determining a length of the second downlink control message based at least in part on the first set of resources indicated by the downlink control message, wherein transmitting the second downlink control message is based at least in part on the length of the second downlink control message.

Aspect 37: The method of any of aspects 22 through 29, wherein the status of communication activity for the first set of resources is indicative that the first set of resources is deactivated.

Aspect 38: The method of any of aspects 22 through 37, wherein transmitting the indication of the configuration of the one or more sets of resources comprises: transmitting an RRC message indicating the one or more sets of resources.

Aspect 39: The method of any of aspects 22 through 38, wherein the first set of resources comprises downlink SPS resources.

Aspect 40: The method of any of aspects 22 through 39, wherein the first set of resources comprises uplink configured grant resources.

Aspect 41: An apparatus for wireless communication at a UE, comprising a processor; memory coupled with the processor; and instructions stored in the memory and executable by the processor to cause the apparatus to perform a method of any of aspects 1 through 21.

Aspect 42: An apparatus for wireless communication at a UE, comprising at least one means for performing a method of any of aspects 1 through 21.

Aspect 43: A non-transitory computer-readable medium storing code for wireless communication at a UE, the code comprising instructions executable by a processor to perform a method of any of aspects 1 through 21.

Aspect 44: An apparatus for wireless communication at a base station, comprising a processor; memory coupled with the processor; and instructions stored in the memory and executable by the processor to cause the apparatus to perform a method of any of aspects 22 through 40.

Aspect 45: An apparatus for wireless communication at a base station, comprising at least one means for performing a method of any of aspects 22 through 40.

Aspect 46: A non-transitory computer-readable medium storing code for wireless communication at a base station, the code comprising instructions executable by a processor to perform a method of any of aspects 22 through 40.

It should be noted that the techniques described herein describe possible implementations, and that the operations and the steps may be rearranged or otherwise modified and that other implementations are possible. Further, aspects from two or more of the techniques may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a network device, a configuration of one or more sets of resources for a plurality of component carriers for communications with the network device;
   receiving a downlink control message indicating a status of communication activity on a first set of resources of the one or more sets of resources, the first set of resources comprising first resources associated with a first component carrier of the plurality of component carriers and second resources associated with a second component carrier of the plurality of component carriers, the second component carrier different from the first component carrier; and
   communicating with the network device based at least in part on the status of communication activity on the first set of resources.

2. The method of claim 1, wherein receiving the configuration of the one or more sets of resources further comprises:
   receiving an indication of the one or more sets of resources for a group of component carriers of the plurality of component carriers, wherein each value of a field of the downlink control message is associated with a set of the one or more sets of resources.

3. The method of claim 1, wherein receiving the configuration of the one or more sets of resources further comprises:
   receiving a list of resources for each component carrier of the plurality of component carriers, wherein each combination of a component carrier of the plurality and a value of a field of the downlink control message is associated with a set of the one or more sets of resources.

4. The method of claim 1, further comprising:
   identifying a field of the downlink control message that indicates the first set of resources, wherein the status of communication activity is based at least in part on identifying the field.

5. The method of claim 4, further comprising:
identifying the first set of resources based at least in part on a value of the field, wherein the status of communication activity is based at least in part on identifying the first set of resources.

6. The method of claim 5, wherein identifying the first set of resources further comprises:
determining a first index of a resource of the first set of resources based at least in part on the configuration of the one or more sets of resources and the value of the field, wherein each resource of the first set of resources is associated with a respective first index indicating a component carrier of the plurality of component carriers that is associated with the respective resource; and
determining a second index of the resource based at least in part on the configuration of the one or more sets of resources and the value of the field, wherein each resource of the first set of resources is associated with a respective second index indicating a respective resource within the associated component carrier, the second index unique to the associated component carrier.

7. The method of claim 6, wherein determining the first index and the second index further comprises:
identifying a component carrier of the plurality used to receive the downlink control message; and
determining, based at least in part on the configuration of the one or more sets of resources, the first index and the second index using a list of indices for the identified component carrier.

8. The method of claim 5, wherein identifying the first set of resources further comprises:
determining an index of a resource of the first set of resources based at least in part on the configuration of the one or more sets of resources and the value of the field, wherein each resource of the first set of resources is associated with a respective index indicating a respective resource, the index global to the plurality of component carriers.

9. The method of claim 8, wherein determining the index further comprises:
identifying a component carrier of the plurality used to receive the downlink control message; and
determining, based at least in part on the configuration of the one or more sets of resources, the index using a list of indices for the identified component carrier.

10. The method of claim 1, wherein receiving the downlink control message indicating the status of communication activity further comprises:
receiving an indication that the first set of resources is activated.

11. The method of claim 10, further comprising:
receiving scheduling information for the first set of resources based at least in part on the first set of resources being activated, the scheduling information comprising a time resource allocation, a frequency resource allocation, a multiplexing scheme, or any combination thereof.

12. The method of claim 11, further comprising:
determining a quantity of bits associated with the scheduling information, the quantity of bits based at least in part on one or more component carriers associated with the first set of resources, wherein receiving the scheduling information is based at least in part on determining the quantity of bits.

13. The method of claim 11, wherein receiving the scheduling information further comprises:
receiving the scheduling information via the downlink control message, wherein a first field of the downlink control message comprises an indication of the first set of resources and a second field of the downlink control message comprises the scheduling information.

14. The method of claim 13, further comprising:
receiving, prior to receiving the downlink control message, a configuration message to semi-statically configure a length of the downlink control message, wherein receiving the downlink control message is based at least in part on the length of the downlink control message.

15. The method of claim 13, further comprising:
determining a length of the downlink control message based at least in part on the one or more sets of resources, wherein receiving the downlink control message is based at least in part on the length of the downlink control message.

16. The method of claim 11, wherein receiving the scheduling information further comprises:
receiving the scheduling information via a second downlink control message.

17. The method of claim 16, further comprising:
determining a length of the second downlink control message based at least in part on the first set of resources indicated by the downlink control message, wherein receiving the second downlink control message is based at least in part on the length of the second downlink control message.

18. The method of claim 1, wherein receiving the downlink control message indicating the status of communication activity further comprises:
receiving an indication that the first set of resources is deactivated.

19. The method of claim 1, wherein the first set of resources comprises downlink semi-persistently scheduled resources.

20. The method of claim 1, wherein the first set of resources comprises uplink configured grant resources.

21. A method for wireless communication at a network device, comprising:
transmitting, for a user equipment (UE), an indication of a configuration of one or more sets of resources for a plurality of component carriers for communications with the UE;
transmitting a downlink control message indicating a first set of resources of the one or more sets of resources based at least in part on a status of communication activity for the first set of resources, the first set of resources comprising first resources associated with a first component carrier of the plurality of component carriers and second resources associated with a second component carrier of the plurality of component carriers, the second component carrier different from the first component carrier; and
communicating with the UE based at least in part on the downlink control message and the status of communication activity for the first set of resources.

22. The method of claim 21, wherein transmitting the indication of the configuration of the one or more sets of resources further comprises:
transmitting an indication of the one or more sets of resources for a group of component carriers of the plurality of component carriers, wherein each value of a field of the downlink control message is associated with a set of the one or more sets of resources.

23. The method of claim 21, wherein transmitting the indication of the configuration of the one or more sets of resources further comprises:
  transmitting a list of resources for each component carrier of the plurality of component carriers, wherein each combination of a component carrier of the plurality and a value of a field of the downlink control message is associated with a set of the one or more sets of resources.

24. The method of claim 21, wherein transmitting the downlink control message indicating the first set of resources further comprises:
  indicating the first set of resources using a value of a field of the downlink control message.

25. The method of claim 24, wherein indicating the first set of resources further comprises:
  indicating a first index of a resource of the first set of resources based at least in part on the configuration of the one or more sets of resources and the value of the field, wherein each resource of the first set of resources is associated with a respective first index indicating a component carrier of the plurality of component carriers that is associated with the respective resource; and
  indicating a second index of the resource based at least in part on the configuration of the one or more sets of resources and the value of the field, wherein each resource of the first set of resources is associated with a respective second index indicating a respective resource within the associated component carrier, the second index unique to the associated component carrier.

26. The method of claim 24, wherein indicating the first set of resources further comprises:
  indicating an index of a resource of the first set of resources based at least in part on the configuration of the one or more sets of resources and the value of the field, wherein each resource of the first set of resources is associated with a respective index indicating a respective resource, the index global to the plurality of component carriers.

27. The method of claim 21, wherein the status of communication activity for the first set of resources is indicative that the first set of resources is activated, the method further comprising:
  transmitting scheduling information for the first set of resources based at least in part on the first set of resources being activated, the scheduling information comprising a time resource allocation, a frequency resource allocation, a multiplexing scheme, or any combination thereof.

28. The method of claim 27, further comprising:
  determining a quantity of bits associated with the scheduling information, the quantity of bits based at least in part on one or more component carriers associated with the first set of resources, wherein transmitting the scheduling information is based at least in part on determining the quantity of bits.

29. An apparatus for wireless communication at a user equipment (UE), comprising:
  a processor;
  memory coupled with the processor; and
  instructions stored in the memory and executable by the processor to cause the apparatus to:
    receive, from a network device, a configuration of one or more sets of resources for a plurality of component carriers for communications with network device;
    receive a downlink control message indicating a status of communication activity on a first set of resources of the one or more sets of resources, the first set of resources comprising first resources associated with a first component carrier of the plurality of component carriers and second resources associated with a second component carrier of the plurality of component carriers, the second component carrier different from the first component carrier; and
    communicate with the network device based at least in part on the status of communication activity on the first set of resources.

30. An apparatus for wireless communication at a network device, comprising:
  a processor;
  memory coupled with the processor; and
  instructions stored in the memory and executable by the processor to cause the apparatus to:
    transmit, to a user equipment (UE), an indication of a configuration of one or more sets of resources for a plurality of component carriers for communications with the UE;
    transmit a downlink control message indicating a first set of resources of the one or more sets of resources based at least in part on a status of communication activity for the first set of resources, the first set of resources comprising first resources associated with a first component carrier of the plurality of component carriers and second resources associated with a second component carrier of the plurality of component carriers, the second component carrier different from the first component carrier; and
    communicate with the UE based at least in part on the downlink control message and the status of communication activity for the first set of resources.

* * * * *